(12) United States Patent
Otsuka

(10) Patent No.: US 11,022,537 B2
(45) Date of Patent: Jun. 1, 2021

(54) INFORMATION PROCESSING APPARATUS, INFORMATION PROCESSING METHOD, AND INFORMATION PROCESSING SYSTEM

(71) Applicant: Sony Corporation, Tokyo (JP)

(72) Inventor: Fumitaka Otsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 453 days.

(21) Appl. No.: 15/759,173

(22) PCT Filed: Jul. 25, 2016

(86) PCT No.: PCT/JP2016/003449
§ 371 (c)(1),
(2) Date: Mar. 9, 2018

(87) PCT Pub. No.: WO2017/046988
PCT Pub. Date: Mar. 23, 2017

(65) Prior Publication Data
US 2018/0259440 A1    Sep. 13, 2018

(30) Foreign Application Priority Data

Jun. 22, 2016 (JP) .............................. JP2016-123226

(51) Int. Cl.
*G01N 15/14* (2006.01)
*G01N 21/64* (2006.01)
(Continued)

(52) U.S. Cl.
CPC ......... *G01N 15/14* (2013.01); *G01N 15/1429* (2013.01); *G01N 15/1459* (2013.01);
(Continued)

(58) Field of Classification Search
CPC ....... G01N 2015/1006; G01N 21/6428; G01N 15/1459; G01N 2015/0065; G01N 15/14; G01N 15/1429
See application file for complete search history.

(56) References Cited

U.S. PATENT DOCUMENTS

| | | | | |
|---|---|---|---|---|
| 5,452,237 A | * | 9/1995 | Jones, Jr. | ........... G01N 15/1227 702/182 |
| 8,209,128 B1 | * | 6/2012 | Gourley | ............. G01N 21/6428 702/19 |

(Continued)

FOREIGN PATENT DOCUMENTS

| | | |
|---|---|---|
| EP | 2 913 656 A1 | 9/2015 |
| JP | 2006-524054 A | 10/2006 |

(Continued)

OTHER PUBLICATIONS

International Preliminary Report on Patentability dated Mar. 29, 2018 in connection with International Application No. PCT/JP2016/003449.

(Continued)

*Primary Examiner* — Shogo Sasaki
(74) *Attorney, Agent, or Firm* — Wolf, Greenfield & Sacks, P.C.

(57) ABSTRACT

According to some aspects, a system that includes a flow cytometer and circuitry is provided. The flow cytometer is configured to generate data indicative of a pulse waveform corresponding to a fluorescence signal of a biological sample. The circuitry is configured to determine peak position information of the pulse waveform by identifying at least one peak of the pulse waveform and determine at least one biological characteristic of the biological sample based on the peak position information.

26 Claims, 18 Drawing Sheets

(51) Int. Cl.
*G01N 15/10* (2006.01)
*G01N 15/00* (2006.01)

(52) U.S. Cl.
CPC . *G01N 21/6428* (2013.01); *G01N 2015/0065* (2013.01); *G01N 2015/1006* (2013.01)

(56) References Cited

U.S. PATENT DOCUMENTS

2007/0143033 A1* 6/2007 Zhang .................... G01N 15/12
702/26
2011/0256575 A1 10/2011 Durack et al.
2014/0268102 A1 9/2014 Shah

FOREIGN PATENT DOCUMENTS

| JP | 2013-015357 A | 1/2013 |
| WO | WO 2006/103920 A1 | 10/2006 |
| WO | WO 2012/032981 A1 | 3/2012 |
| WO | WO 2013/147114 A1 | 10/2013 |

OTHER PUBLICATIONS

International Search Report and Written Opinion dated Nov. 4, 2016 in connection with International Application No. PCT/JP2016/003449.
Cremer et al., "Flow cytometry of chromosomes: Principles and applications in medicine and molecular biology", Optik, vol. 82, No. 1, Apr. 1, 1989, pp. 9-18.
Zhong et al., "Quantitative two-photon flow cytometry—in vitro and in vivo", Journal of Biomedical Optics, vol. 13, No. 3, May 1, 2008, pp. 1-18.
Japanese Office Action dated Sep. 30, 2020 in connection with Japanese Application No. 2016-123226, and English translation thereof.

* cited by examiner

[Fig. 1]
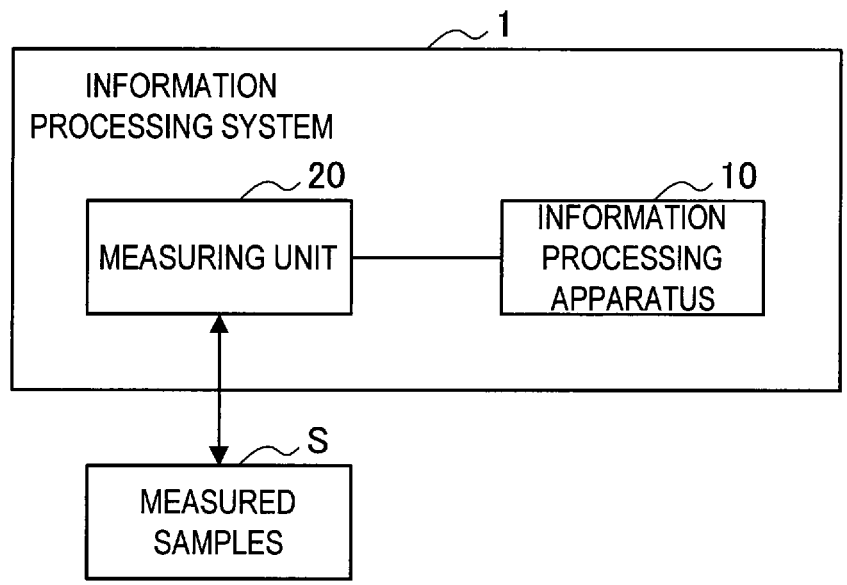
[Fig. 2]
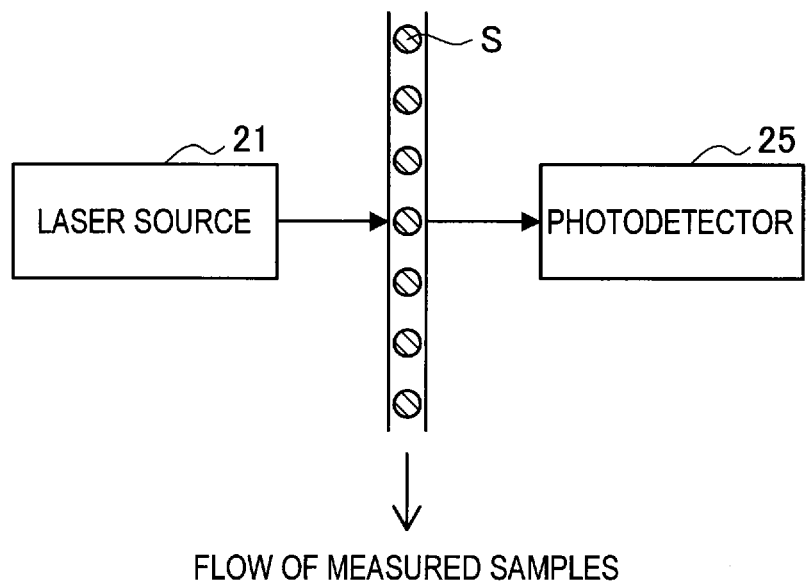
FLOW OF MEASURED SAMPLES

[Fig. 3]
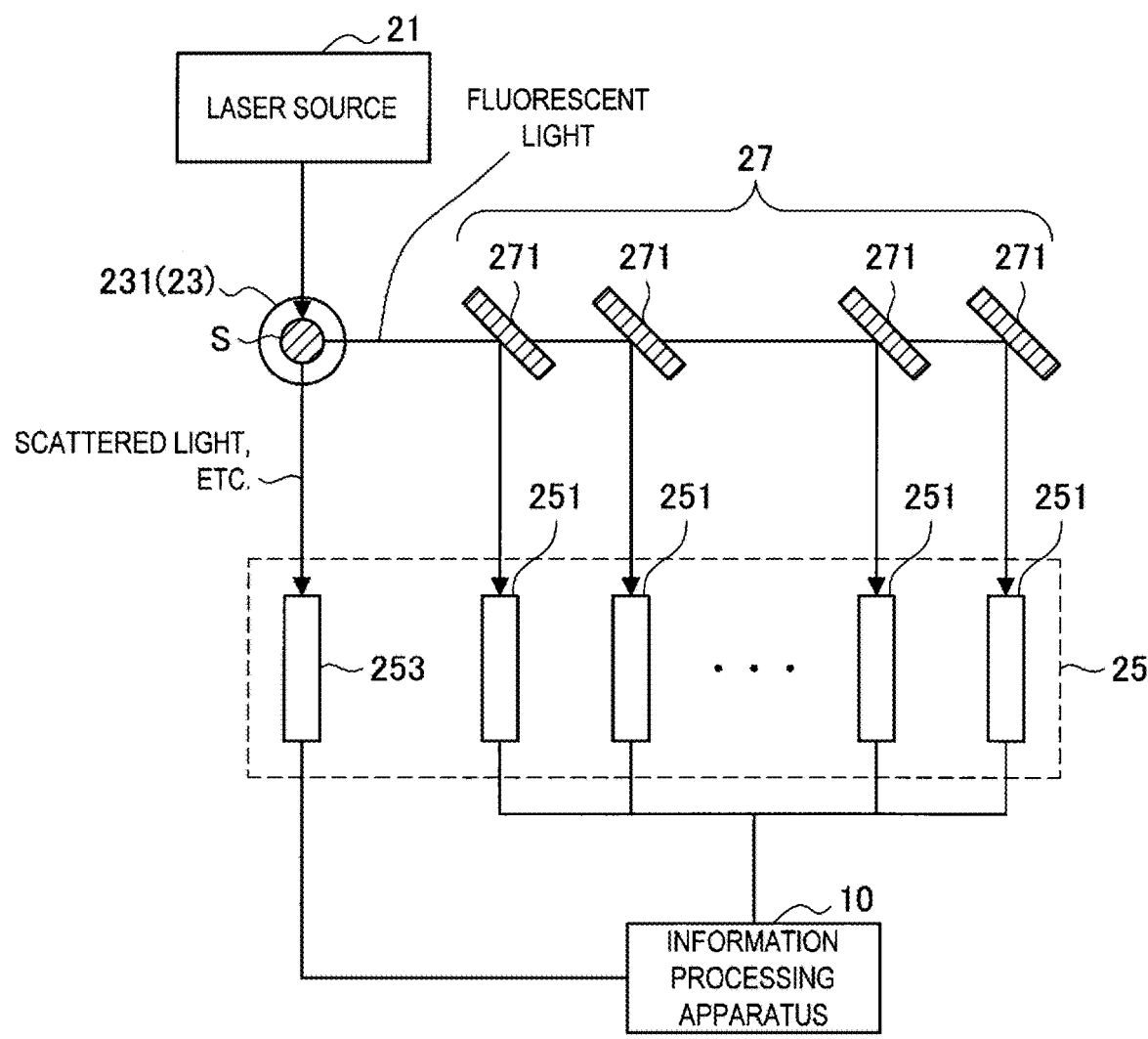

[Fig. 4]
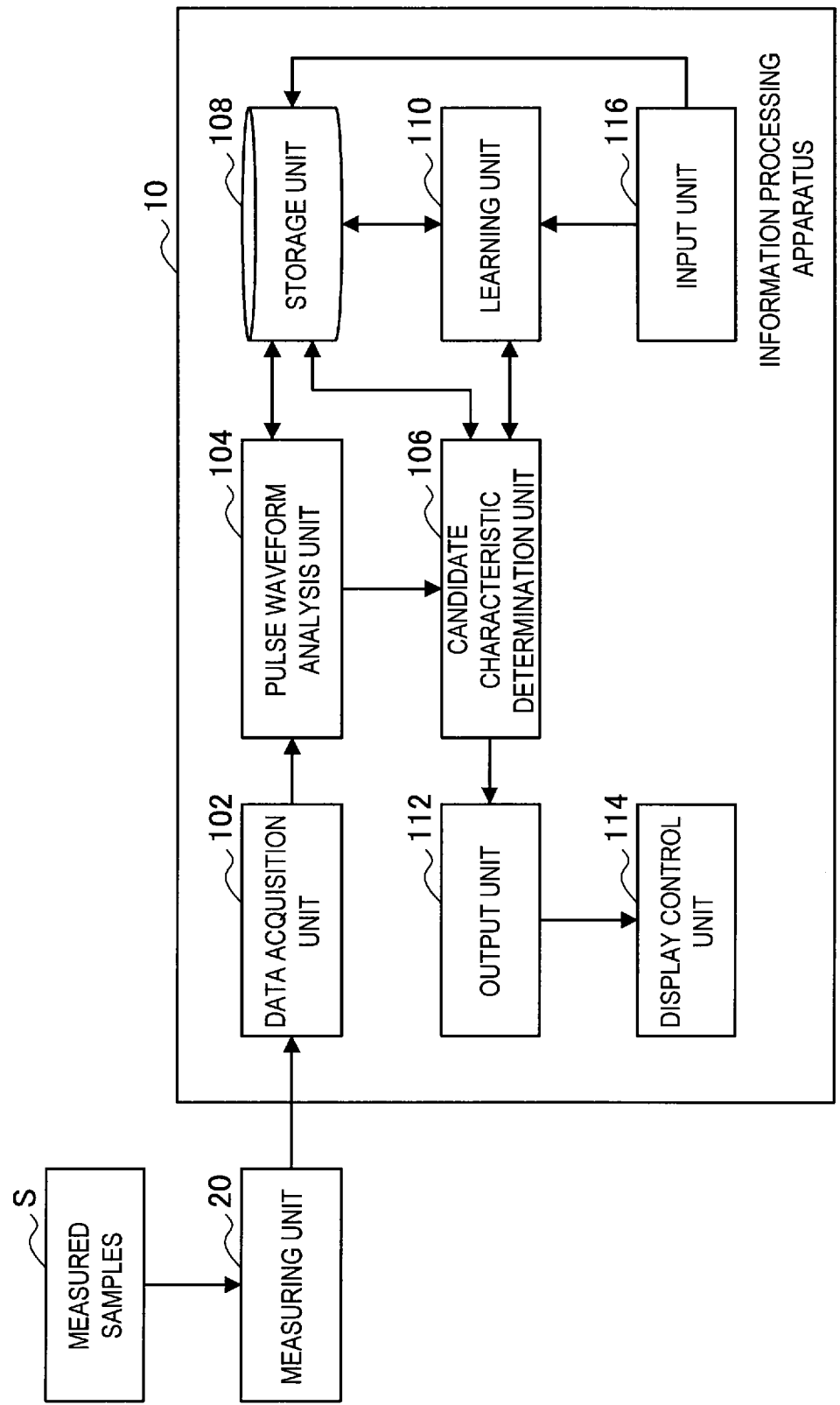

[Fig. 5]
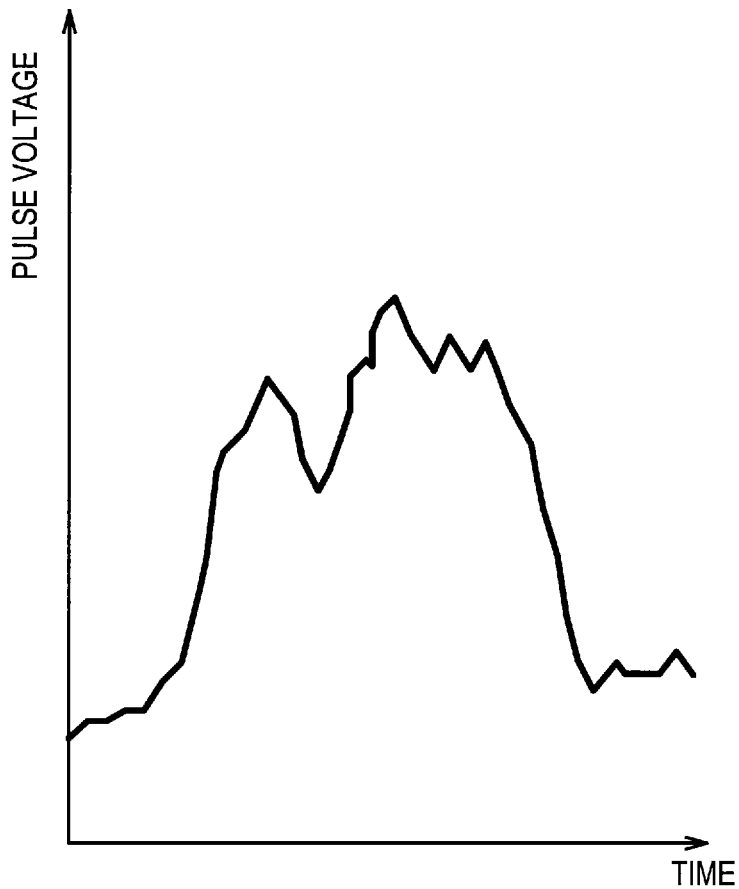
[Fig. 6]
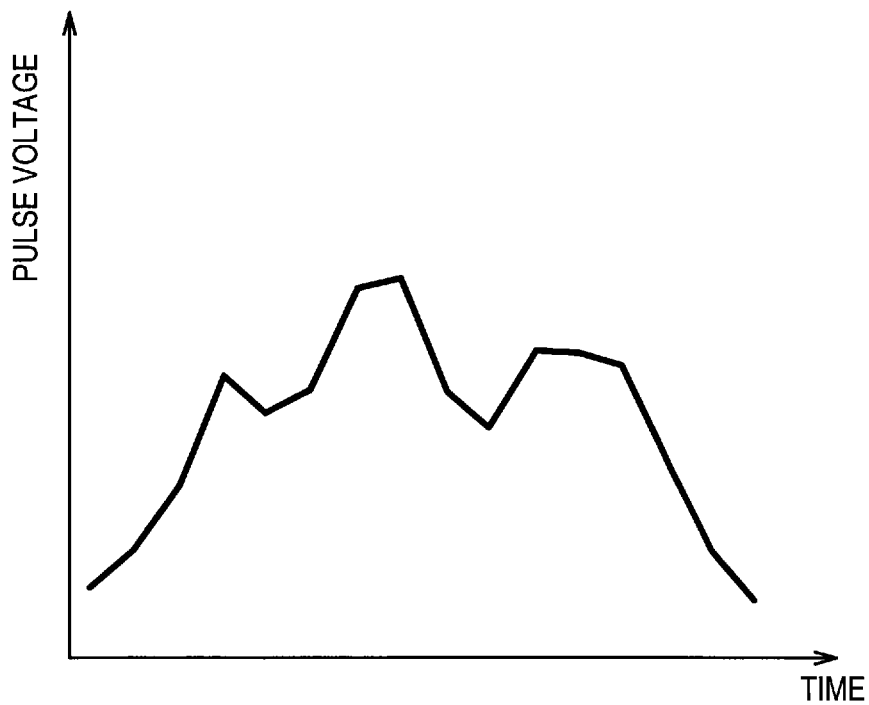

[Fig. 7]
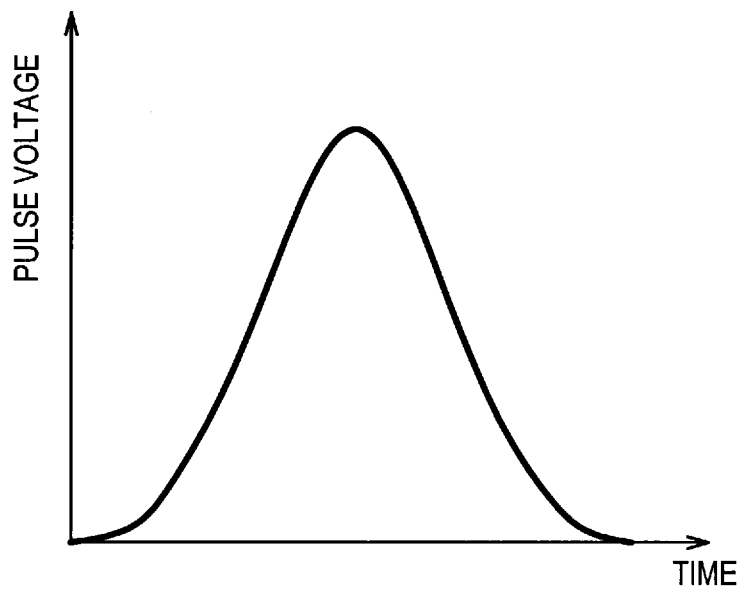
[Fig. 8]
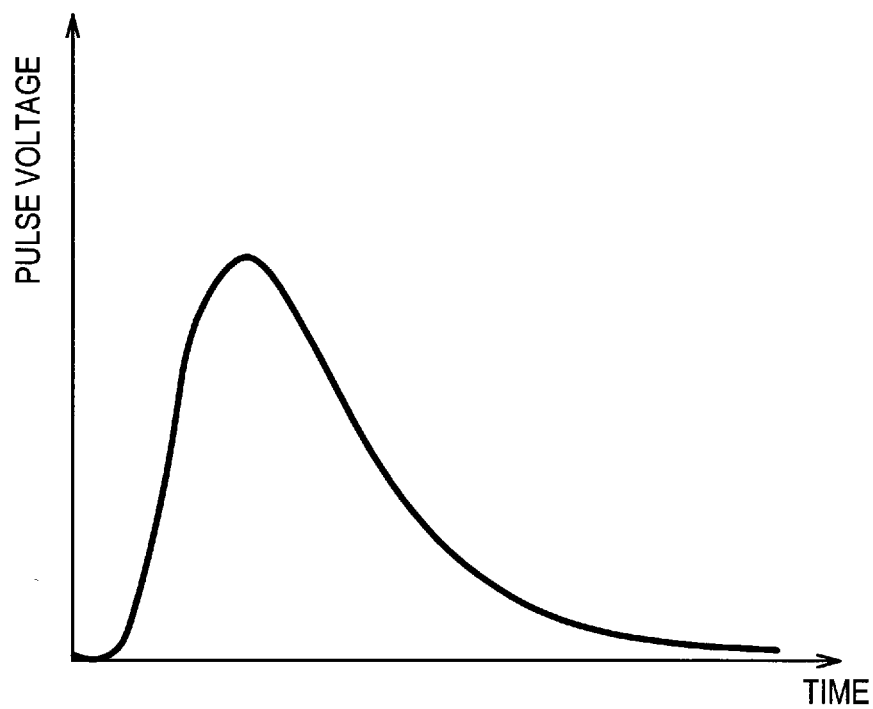

[Fig. 9]
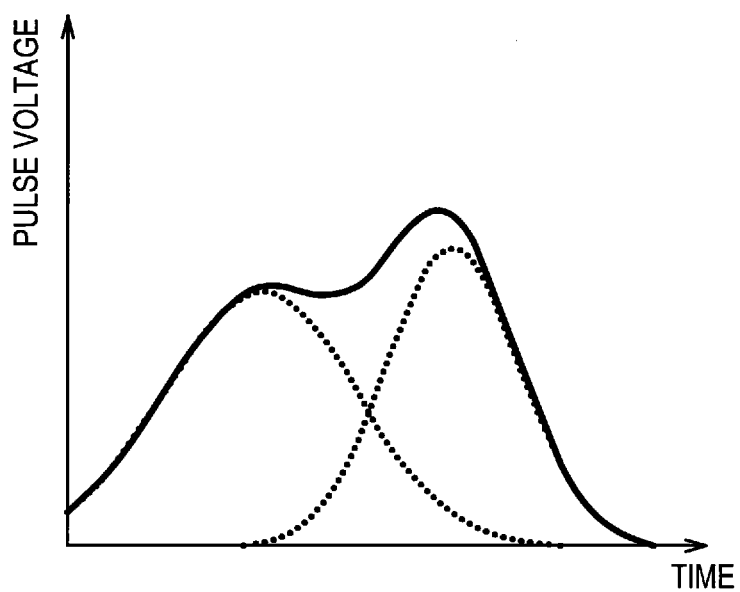
[Fig. 10]
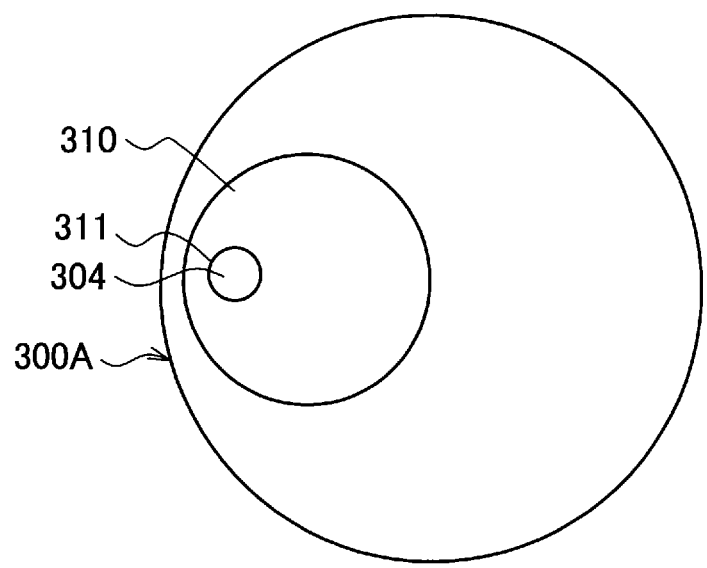

[Fig. 11]
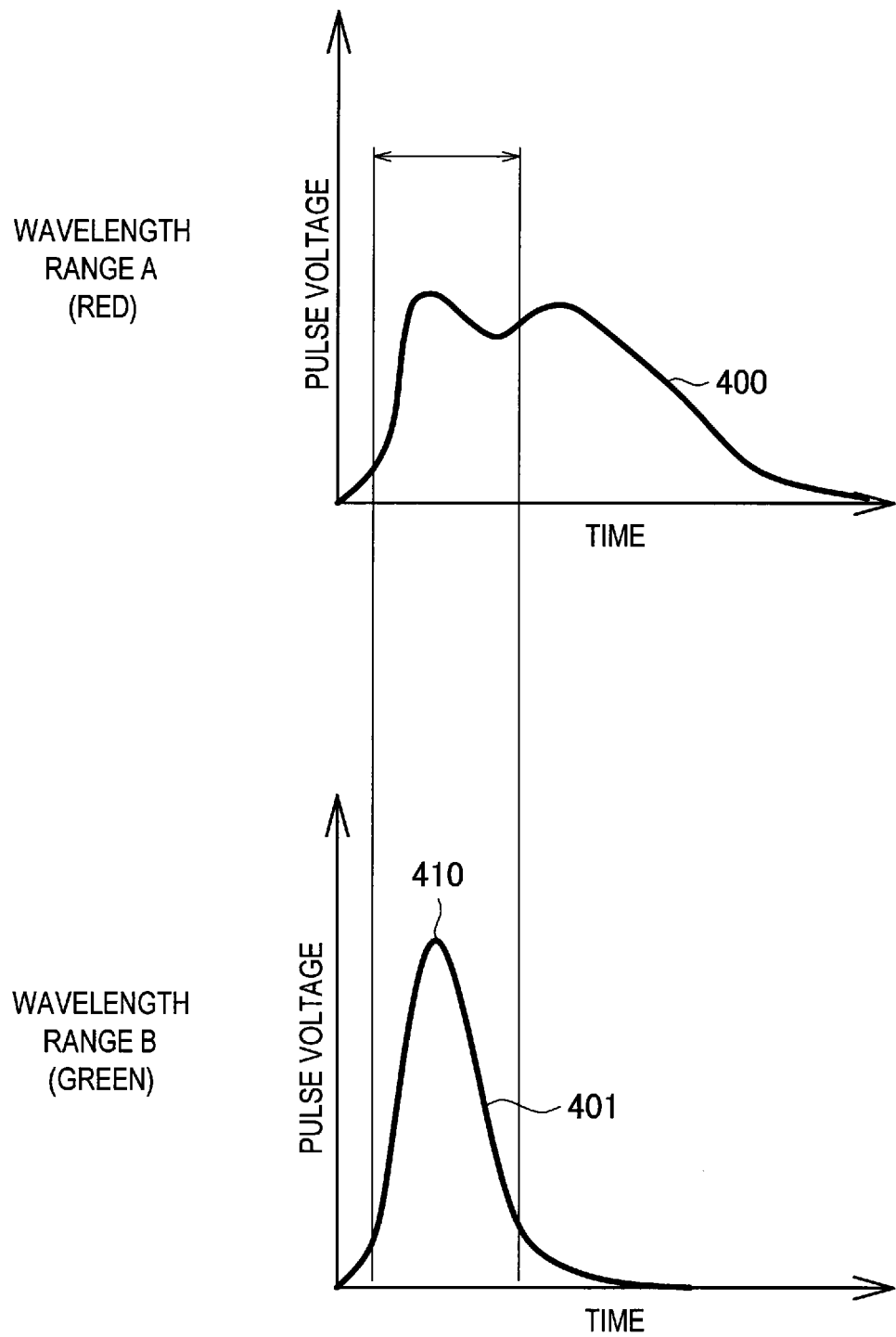

[Fig. 12]
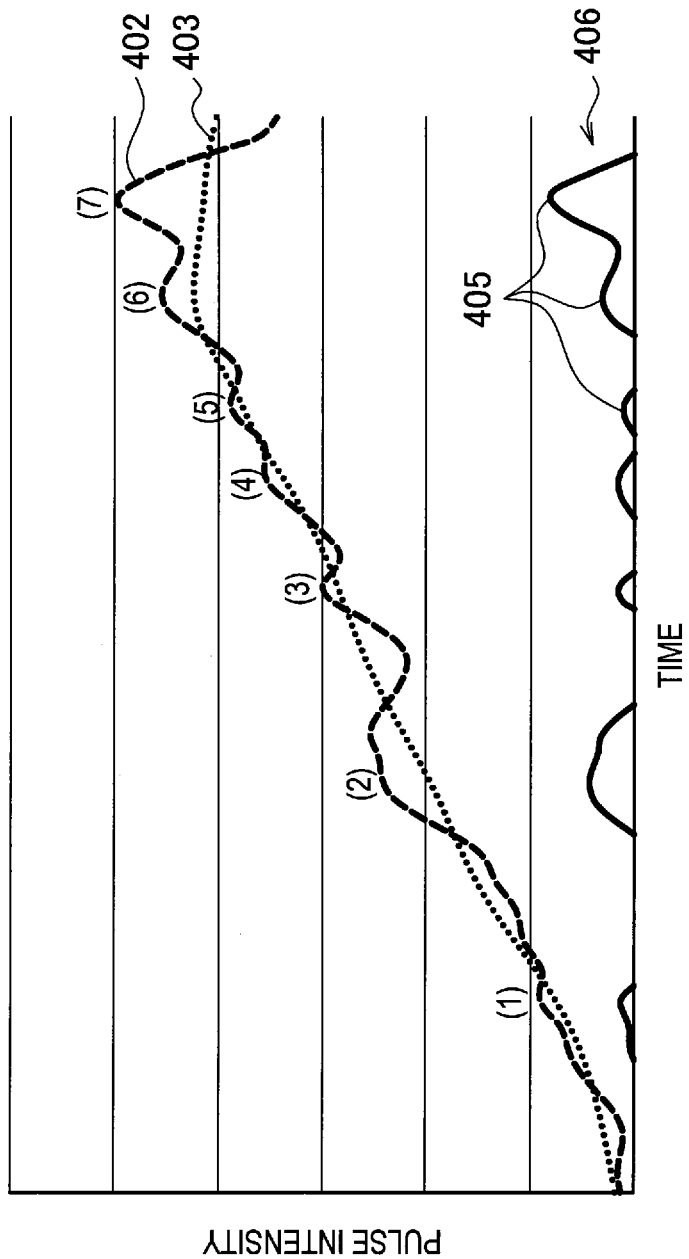

[Fig. 13]
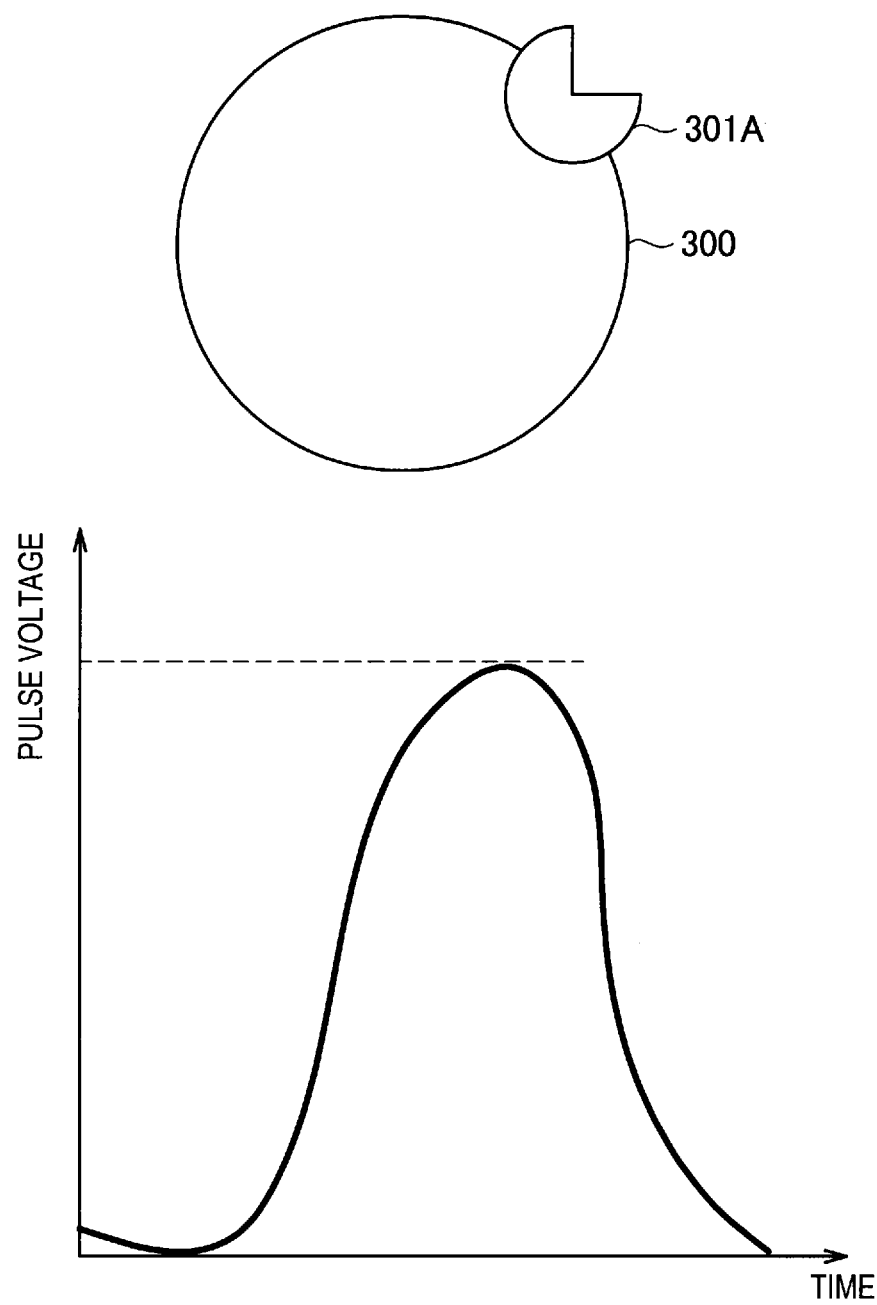

[Fig. 14]
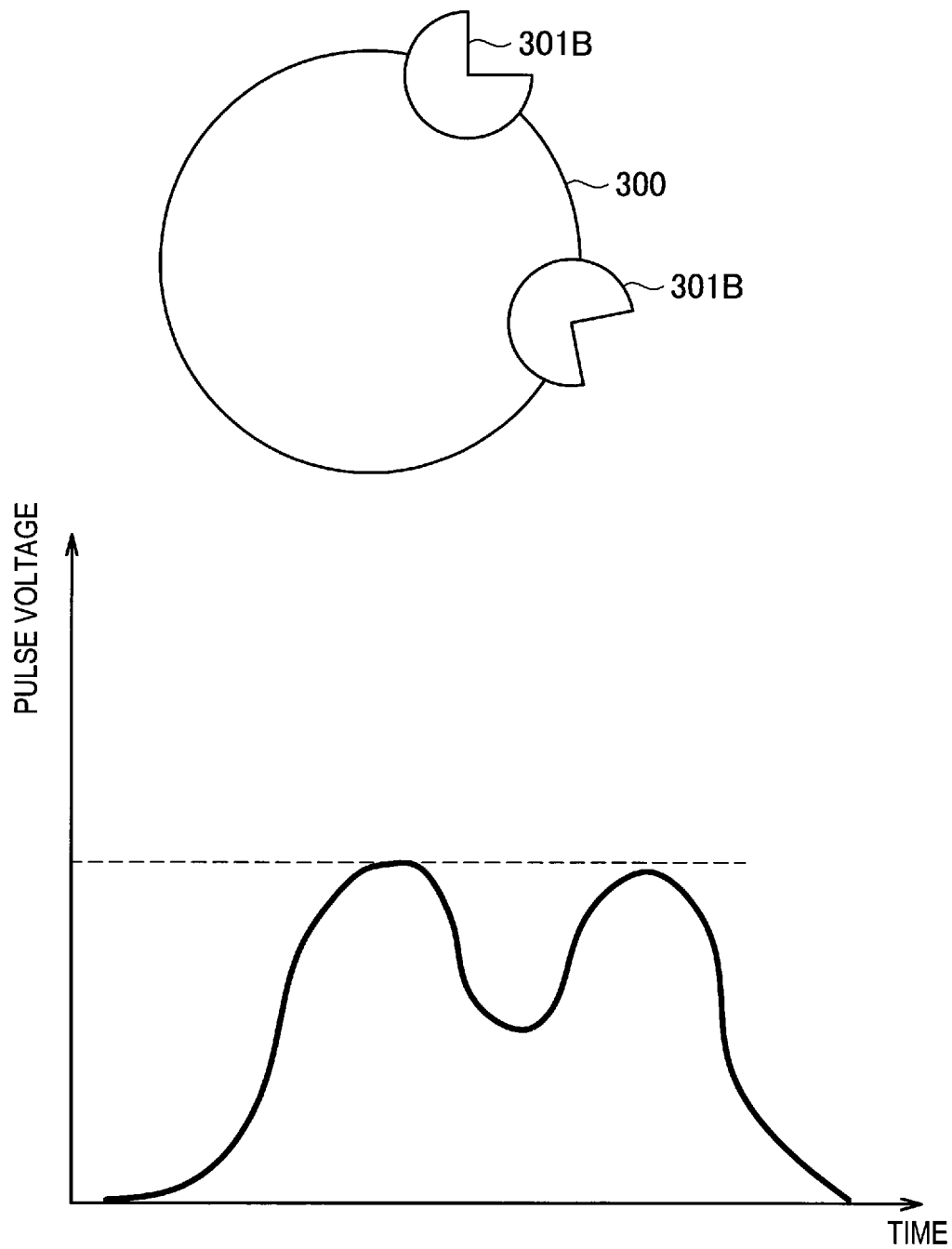

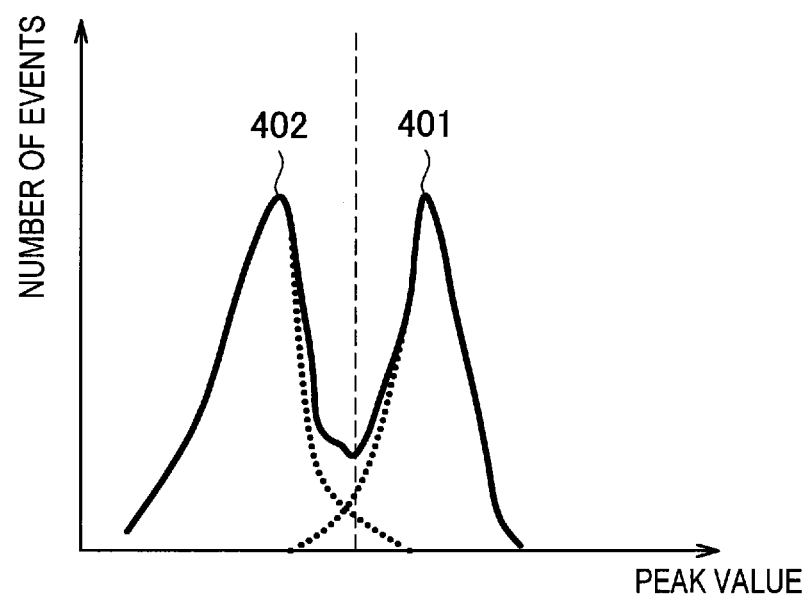
[Fig. 15]

[Fig. 16]
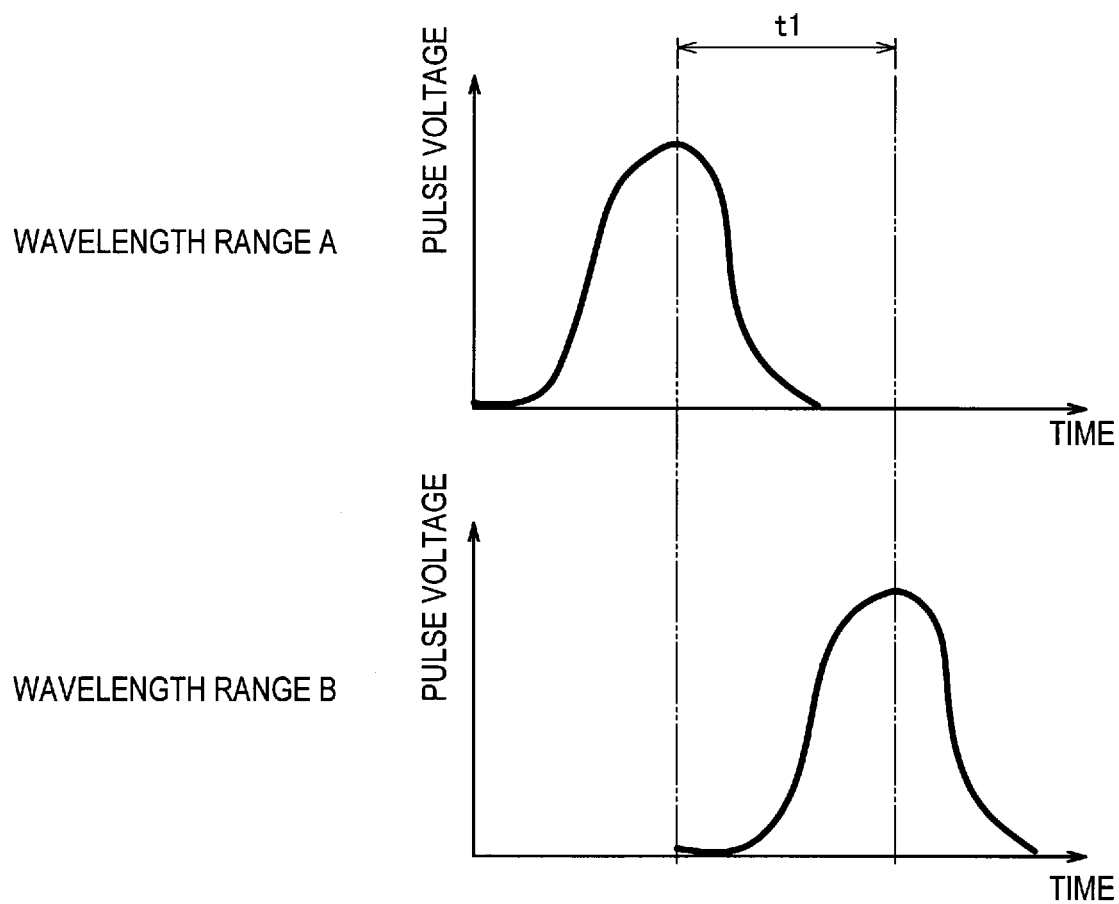

[Fig. 17]
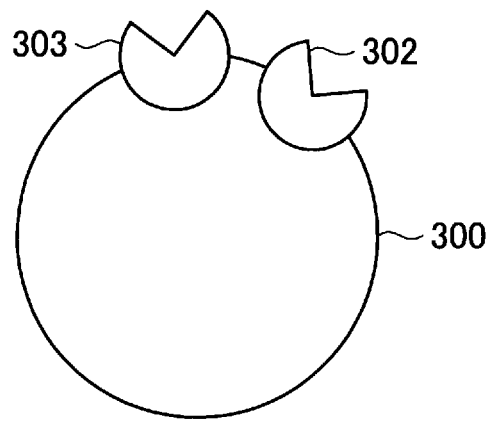
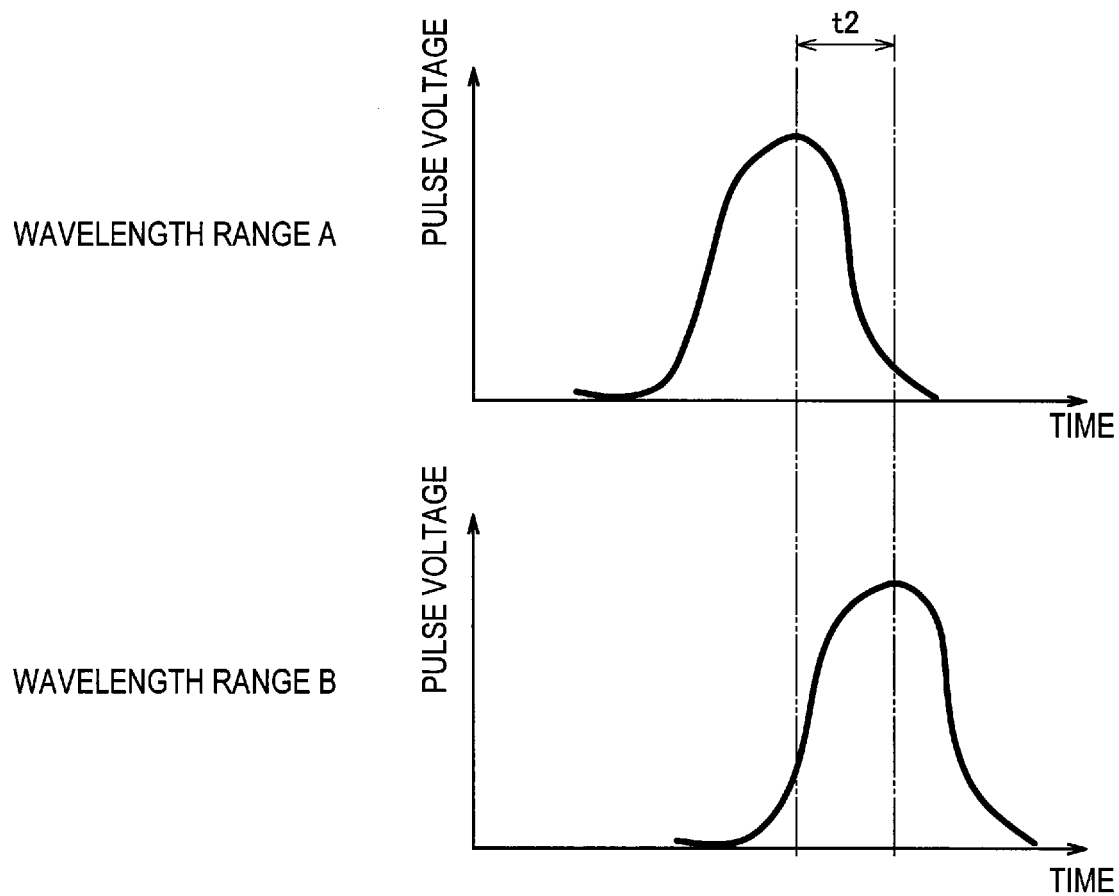
WAVELENGTH RANGE A
WAVELENGTH RANGE B

[Fig. 18]
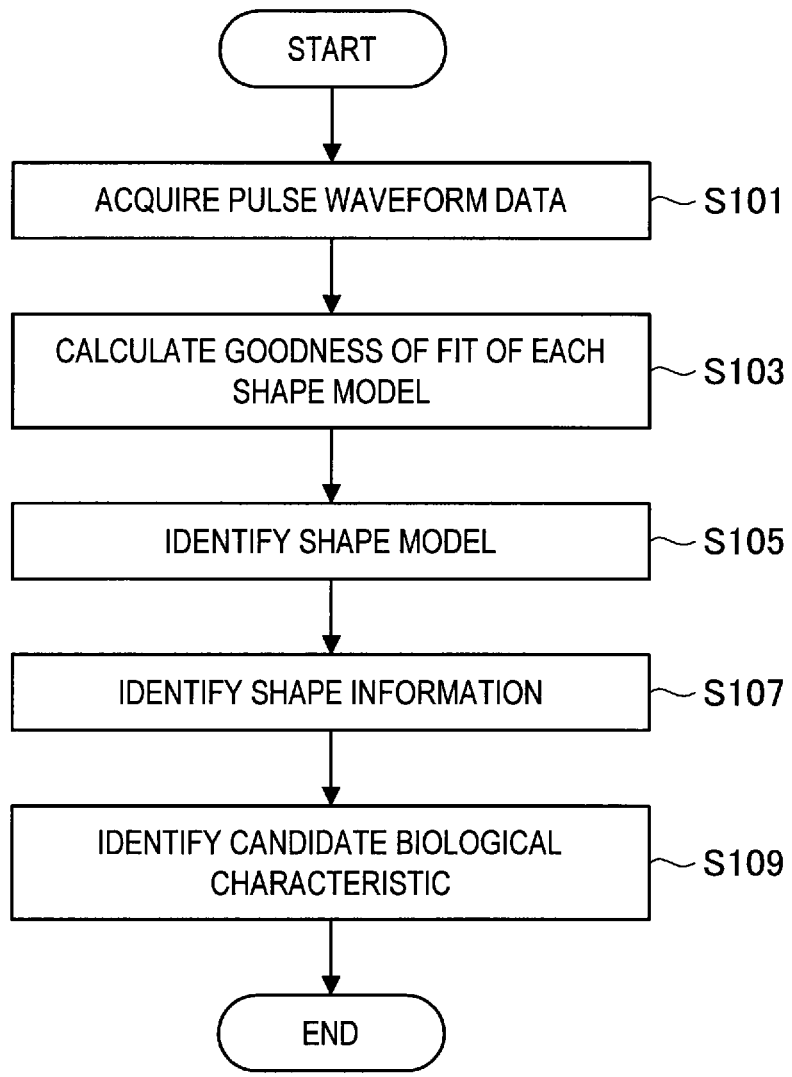

[Fig. 19]
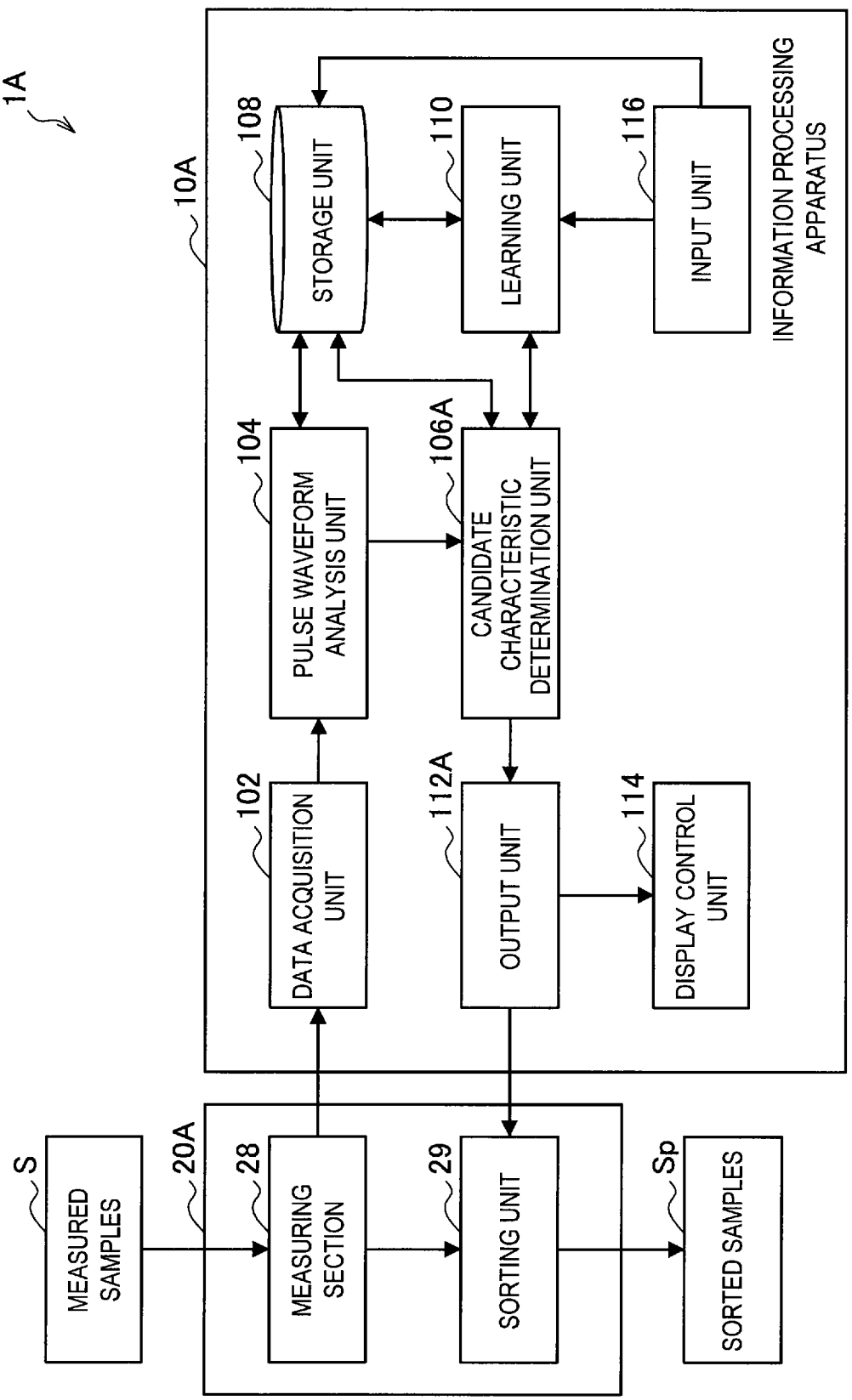

[Fig. 20]
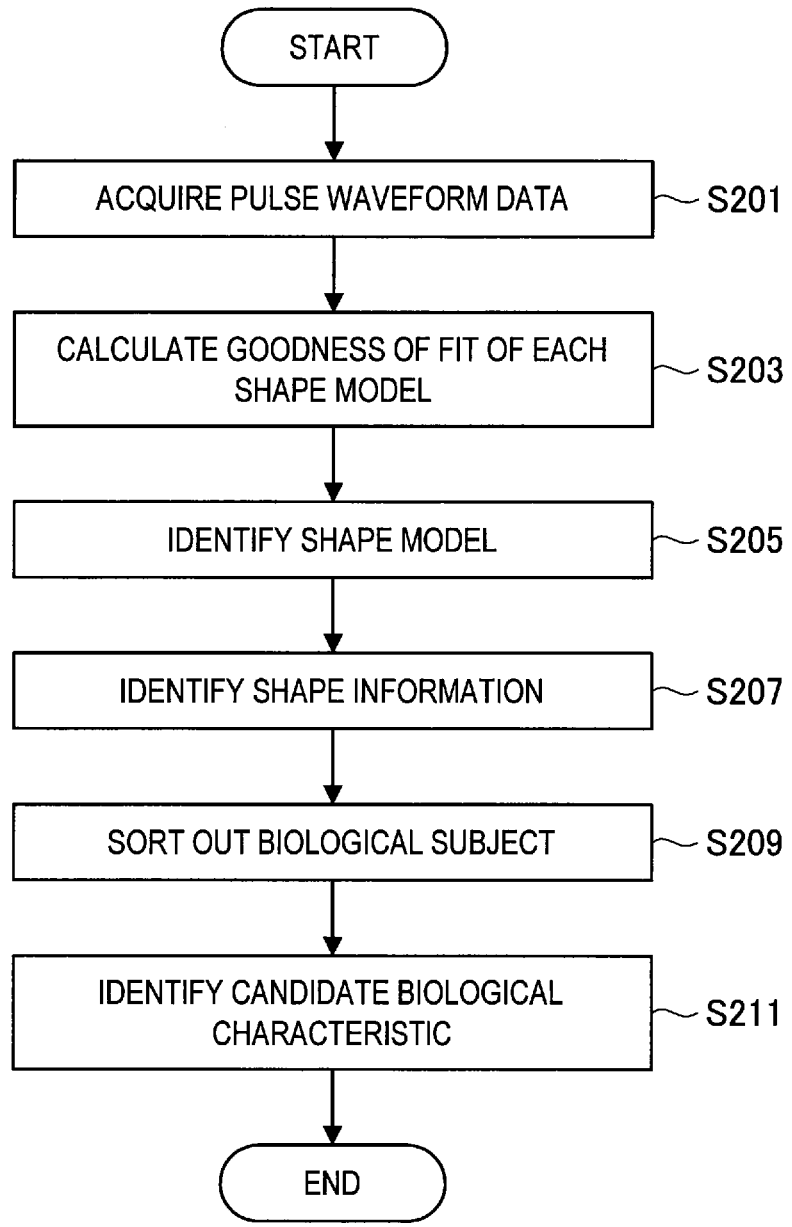

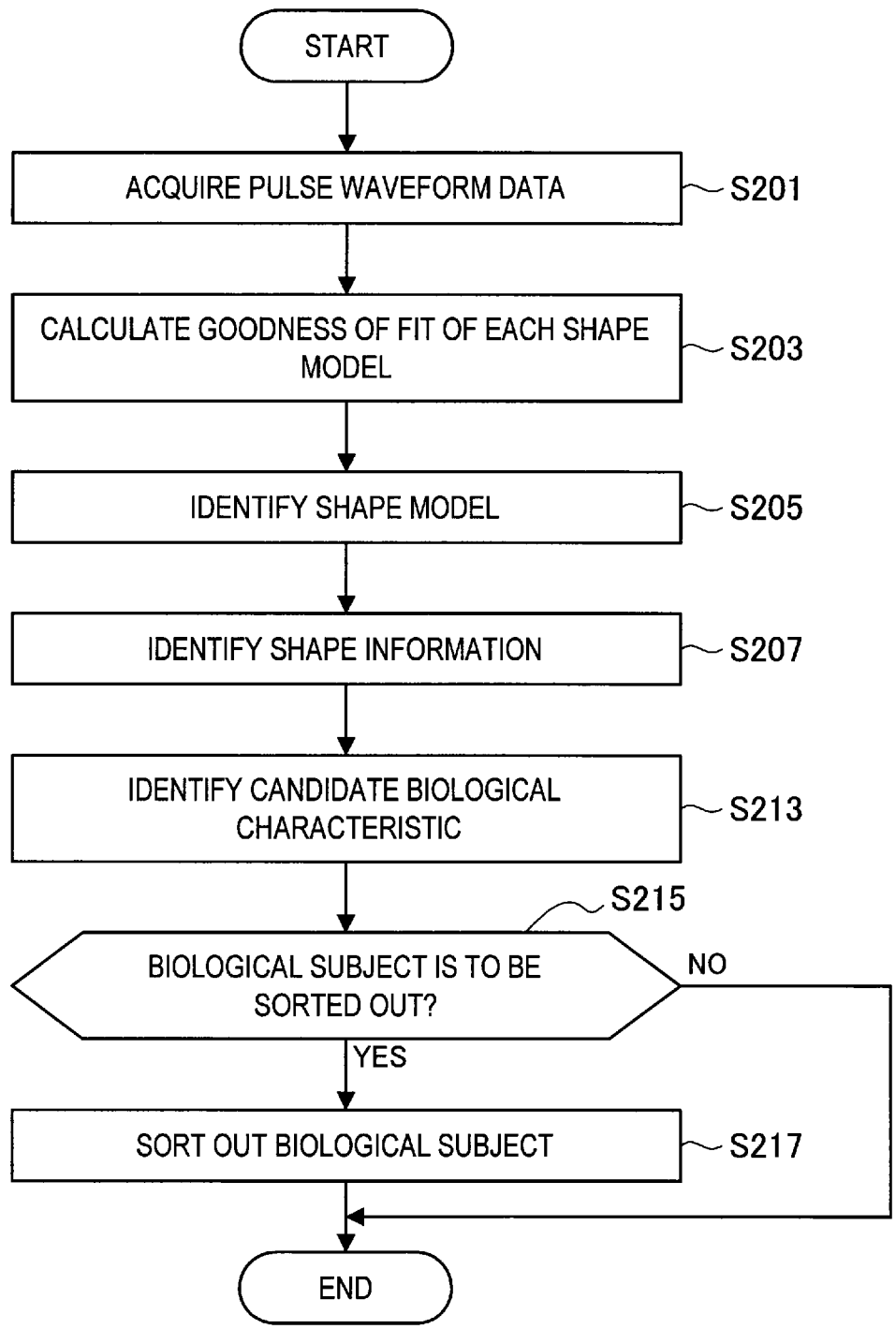
[Fig. 21]

[Fig. 22]
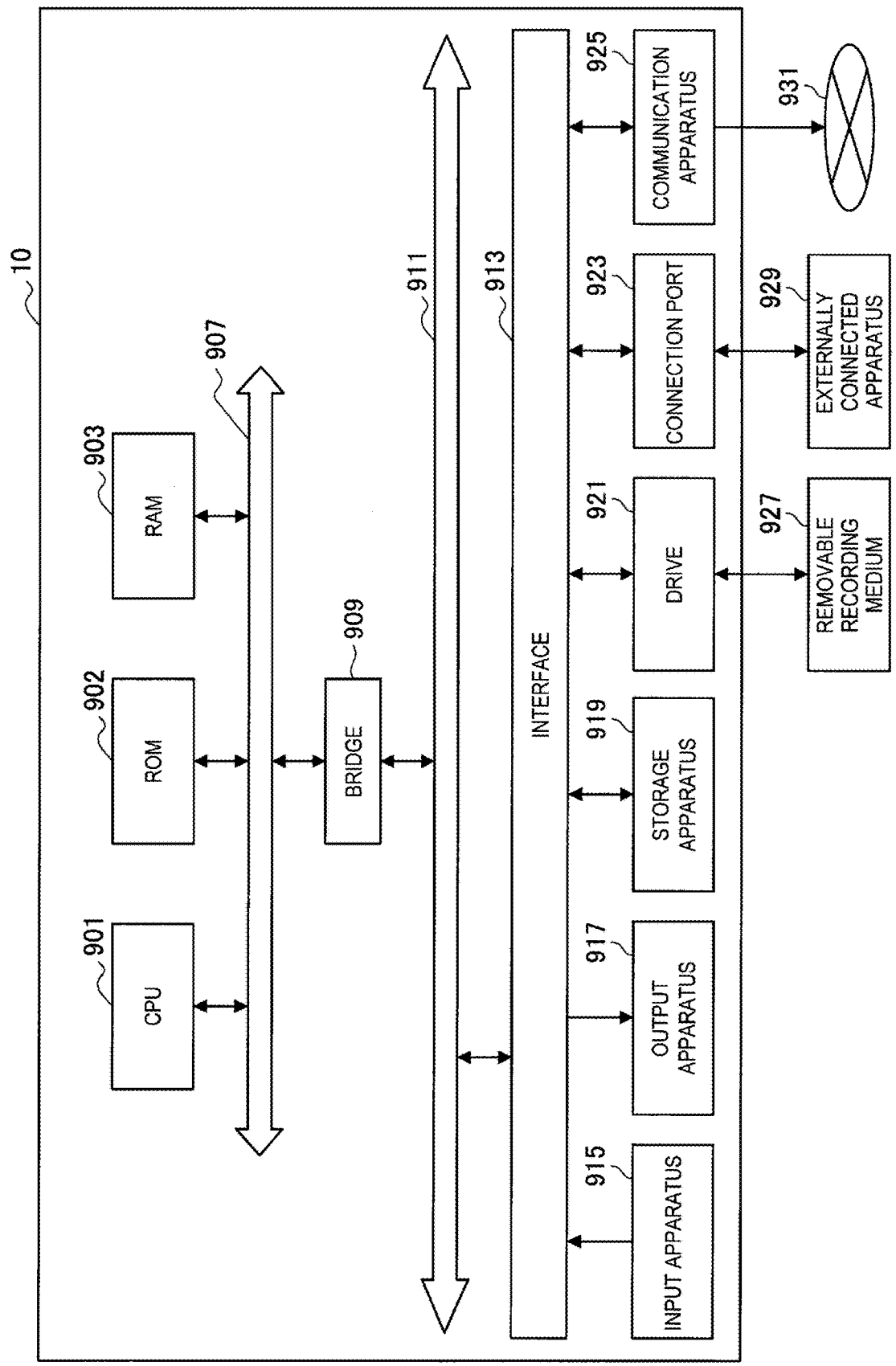

INFORMATION PROCESSING APPARATUS, INFORMATION PROCESSING METHOD, AND INFORMATION PROCESSING SYSTEM

CROSS REFERENCE TO RELATED APPLICATIONS

This application is a U.S. National Stage Entry filed under 35 U.S.C. § 371 of International Application No. PCT/JP2016/003449 filed on Jul. 25, 2016. International Application Serial No. PCT/JP2016/003449 claims priority to Japanese Priority Patent Application JP 2015-185107 filed Sep. 18, 2015, and Japanese Priority Patent Application JP 2016-123226 filed Jun. 22, 2016, each of which is herein incorporated by reference in its entirety.

TECHNICAL FIELD

The present disclosure relates to an information processing apparatus, an information processing method, and an information processing system.

BACKGROUND ART

A flow cytometer is known as an apparatus to observe properties of individual particles to be observed. When a common flow cytometer is used, scattered light or fluorescent light obtained by emitting a laser beam to particles is obtained in the form of a pulse waveform, and an area, height, and width of the pulse waveform are used to determine or identify the properties of each individual particle.

A slit scanning method and a critical slope difference method have been proposed as methods to obtain more information than the information that can be obtained about individual particles from the areas, heights, and widths of the pulse waveforms (see, for example, PTL 1).

CITATION LIST

Patent Literature

PTL 1: JP 2006-524054T

SUMMARY

Technical Problem

The slit scanning method, however, requires a specialized laser system for measurement. In addition, the slit scanning method is employed to achieve an improved resolution by adopting a portion of a pulse, and can thus exhibit high identification performance for only limited objects to be measured. Meanwhile, the critical slope difference method requires a portion of the pulse waveform at which a slope difference is greatest to be determined in advance, and involves a complicated and cumbersome procedure. In addition, the critical slope difference method can measure only objects the pulse waveforms of which have basically the same shape.

Accordingly, an embodiment of the present disclosure proposes a novel and improved information processing apparatus, information processing method, and information processing system which enable easy acquisition of particle information that is difficult and cumbersome to acquire with known methods.

Solution to Problem

According to an aspect of the present application, a system that includes a flow cytometer and circuitry is provided. The flow cytometer is configured to generate data indicative of a pulse waveform corresponding to a fluorescence signal of a biological sample. The circuitry is configured to determine peak position information of the pulse waveform by identifying at least one peak of the pulse waveform and determine at least one biological characteristic of the biological sample based on the peak position information.

According to an aspect of the present application, a flow cytometer information processing method is provided. The flow cytometer information processing method includes determining peak position information of a pulse waveform corresponding to a fluorescence signal of a biological sample by identifying at least one peak of the pulse waveform and determining at least one biological characteristic of the biological sample based on the peak position information.

According to an aspect of the present application, at least one computer-readable storage medium storing computer-executable instructions that, when executed, perform a flow cytometer information processing method is provided. The flow cytometer information processing method includes determining peak position information of a pulse waveform corresponding to a fluorescence signal of a biological sample by identifying at least one peak of the pulse waveform and determining at least one biological characteristic of the biological sample based on the peak position information.

Advantageous Effects of Invention

As described above, an embodiment of the present disclosure provides a novel and improved information processing apparatus, information processing method, and information processing system which enable easy acquisition of particle information that it is difficult and cumbersome to acquire with known methods.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is an explanatory diagram illustrating an information processing system according to a first embodiment of the present disclosure.

FIG. 2 is a schematic diagram for explaining a measuring unit included in the information processing system illustrated in FIG. 1.

FIG. 3 is a schematic diagram for explaining a measuring unit included in the information processing system illustrated in FIG. 1.

FIG. 4 is a block diagram illustrating the structure of an information processing apparatus according to the first embodiment of the present disclosure.

FIG. 5 is an outline diagram of an example pulse waveform detected by the measuring unit illustrated in FIG. 1.

FIG. 6 is an outline diagram of an example pulse waveform detected by the measuring unit illustrated in FIG. 1.

FIG. 7 is a schematic diagram illustrating an example shape model that can be used by a pulse waveform analysis unit illustrated in FIG. 4.

FIG. 8 is a schematic diagram illustrating an example shape model that can be used by a pulse waveform analysis unit illustrated in FIG. 4.

FIG. 9 is a schematic diagram illustrating an example shape model that can be used by a pulse waveform analysis unit illustrated in FIG. 4.

FIG. 10 is a diagram for describing an example biological subject that may be analyzed by an information processing system illustrated in FIG. 1.

FIG. 11 is a diagram for describing an example analysis of a pulse waveform by a pulse waveform analysis unit illustrated in FIG. 4.

FIG. 12 is a diagram for describing an example analysis of a pulse waveform by a pulse waveform analysis unit illustrated in FIG. 4.

FIG. 13 schematically illustrates a biological subject which is supposed to produce a pulse waveform having one peak.

FIG. 14 schematically illustrates a biological subject which is supposed to produce a pulse waveform having two peaks.

FIG. 15 is a histogram for explaining an identification of a biological subject using peak values of pulse waveforms according to a known technique.

FIG. 16 is an outline diagram for explaining identification and discrimination of the positional relationship between different antigens in a cell.

FIG. 17 is an outline diagram for explaining identification and discrimination of the positional relationship between different antigens in a cell.

FIG. 18 is a flowchart illustrating an example procedure of an information processing method according to the first embodiment of the present disclosure.

FIG. 19 is a block diagram illustrating an information processing system according to a second embodiment of the present disclosure.

FIG. 20 is a flowchart illustrating an example procedure of an information processing method according to the second embodiment of the present disclosure.

FIG. 21 is a flowchart illustrating an example procedure of an information processing method according to the second embodiment of the present disclosure.

FIG. 22 is a block diagram for explaining the hardware configuration of the information processing apparatus according to the first embodiment of the present disclosure.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted. Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Note that description will be provided in the following order.
1. First embodiment (cell analyzer)
1.1. Outline of information processing system
1.2. Measured samples
1.3. Structure of measuring unit
1.4. Structure of information processing apparatus
1.5. Procedure of information processing method
2. Second embodiment (cell sorter)
2.1. Structure of information processing system
2.2. Procedures of information processing methods
3. Hardware configuration of information processing apparatus

1. First Embodiment

Hereinafter, a first embodiment of the present disclosure will be described in detail with reference to FIGS. 1 to 18.

(1.1. Outline of Information Processing System)

First, an information processing system according to the present embodiment will be described below with reference to FIG. 1. FIG. 1 is an explanatory diagram illustrating the information processing system according to the first embodiment. FIGS. 2 and 3 are each a schematic diagram for explaining a measuring unit included in the information processing system illustrated in FIG. 1.

Referring to FIG. 1, an information processing system 1 according to the present embodiment includes an information processing apparatus 10 and a measuring unit 20 configured to measure samples S (hereinafter referred to as "measured samples S" as appropriate) to obtain measurement data of the measured samples S. The measuring unit 20 may be of any type.

In the present embodiment, the measured samples S are biological subjects, and examples of the biological subjects that can be used in the present embodiment include biological particles, such as cells, microbes, or liposomes.

Examples of the biological particles include chromosomes, liposomes, mitochondria, and organelles (cell organelles) of various cells. Examples of the cells include animal cells (e.g., blood cells) and plant cells. Examples of the microbes include bacteria, such as colon bacilli, viruses, such as tobacco mosaic viruses, and fungi, such as yeast. Examples of the biological particles may include biological polymers, such as nucleic acids, proteins, and complexes thereof. The shape of such particles may be spherical or nonspherical, and such particles may have any size or mass. Note, however, that when the biological particle has an anisotropic shape, a candidate characteristic, e.g., a candidate biological characteristic, of the biological particle can be determined with increased precision based on shape information, as described below.

The information processing apparatus 10 acquires the measurement data of the measured sample S obtained by the measuring unit 20, and determines the candidate characteristic, e.g., the candidate biological characteristic, which is estimated based on the acquired measurement data, which is data of a pulse waveform. While, in FIG. 1, the information processing apparatus 10 according to the present embodiment is provided as an apparatus separate from the measuring unit 20, functions of the information processing apparatus 10 according to the present embodiment may be implemented via a computer that controls an operation of the measuring unit 20, or via any other computer provided in a case of the measuring unit 20. The detailed structure of the information processing apparatus 10 will be described in detail below.

The measuring unit 20 emits a laser beam to the measured sample S, and measures light, such as fluorescent light or phosphorescence, emitted from the measured sample S, scattered light from the measured sample S, or an absorption spectrum by the measured sample S. The measuring unit 20 according to the present embodiment may be configured to measure an emission spectrum, a scattering spectrum, or an absorption spectrum of the measured sample S, or may be configured to measure two or more of the emission spectrum, the scattering spectrum, and the absorption spectrum of the measured sample S.

In the example described in detail below, a measuring unit (i.e., a flow cytometer) as illustrated in FIGS. 2 and 3, which measures a fluorescence spectrum of the measured sample S, is used as the measuring unit 20.

(1.2. Measured Samples)

A biological subject which is a measured sample may be labeled (i.e., dyed) with one or more fluorochromes prior to a measurement of the fluorescence spectrum. Fluorochrome labeling of the biological subject may be performed by any known method. In the case where cells are subjects to be measured, for example, fluorescently labeled antibodies for cell surface molecules are mixed with the cells, and the antibodies are allowed to bind to the cell surface molecules. The fluorescently labeled antibodies may be antibodies to which fluorochromes are directly bound, or may be biotin-labeled antibodies bound by avidin-biotin reaction with fluorochromes to which avidin is bound. The antibodies may be monoclonal antibodies or polyclonal antibodies.

Any fluorochrome may be used to label the biological subjects, and one or more known substances, for example, may be used to label the biological subjects. Examples of fluorochromes to be used include phycoerythrin (PE), FITC, PE-Cy5, PE-Cy7, PE-Texas red, allophycocyanin (APC), APC-Cy7, ethidium bromide, propidium iodide, Hoechst 33258/33342, DAPI, acridine orange, chromomycin, mithramycin, olivomycin, pyronin Y, thiazole orange, rhodamine 101, isothiocyanate, BCECF, BCECF-AM, C.SNARF-1, C.SNARF-1-AMA, aequorin, Indo-1, Indo-1-AM, Fluo-3, Fluo-3-AM, Fura-2, Fura-2-AM, oxonol, Texas red, rhodamine 123, 10-N-nonyl acridine orange (acridine orange), fluorescein, fluorescein diacetate, carboxyfluorescein, carboxyfluorescein diacetate, carboxydichlorofluorescein, and carboxydichlorofluorescein diacetate. Note that the fluorochromes that can be used in the present embodiment are not limited to the examples mentioned above.

(1.3. Structure of Measuring Unit)

The flow cytometer, which is an example of the measuring unit 20 according to the present embodiment, is a cell analyzer capable of analyzing each biological sample S. Referring to FIG. 2, a laser beam having a wavelength capable of exciting the fluorochrome(s) used to dye the samples S is emitted from a laser source 21 to the dyed biological samples S flowing in a flow cell 231. In addition, a photodetector 25 provided in the flow cytometer detects fluorescent light emitted from the biological samples S irradiated with the laser beam through photodetectors, such as photomultipliers 251. Note that, although only one laser source 21 is shown in FIG. 2, a plurality of laser sources may be provided.

The flow cytometer, which performs the above-described measuring process, may have a known structure, such as, for example, a structure as illustrated in FIG. 3.

Referring to FIG. 3, the flow cytometer includes the laser source 21, which emits a laser beam of a predetermined wavelength (for example, a laser beam of a wavelength of 488 nm or 640 nm), and the flow cell 231, and also includes a flow system 23 configured to align and move the measured samples S in the flow cell 231, an optical system (not shown), such as a lens, configured to guide the laser beam to the measured samples S, the photodetector 25, which is configured to detect the fluorescent light and the scattered light, such as forward-scattered light or backward-scattered light, emitted from the measured samples S, and various optical systems 27 configured to guide the fluorescent light or the scattered light to the photodetector 25.

Here, in the example illustrated in FIG. 3, a plurality of (for example, about eight) photomultipliers 251 each of which is configured to detect the fluorescent light from the measured samples S, and a detector 253, such as a charge coupled device (CCD), a complementary metal oxide semiconductor (CMOS), or a photodiode, which is configured to detect the scattered light or the like from the measured samples S, are provided as the photodetector 25.

The fluorescent light from each measured sample S caused by the laser beam emitted from the laser source 21 is separated by wavelength selection filters 271 of the optical systems 27, the wavelength selection filters 271 being provided between the measured sample S and the corresponding photomultipliers 251, into beams in predetermined wavelength ranges, and each of the beams is guided to a corresponding one of the photomultipliers 251. Each photomultiplier 251 outputs measurement data representing a detection result of fluorescent light in the corresponding wavelength range to the information processing apparatus 10 according to the present embodiment.

As described above, the information processing apparatus 10 according to the present embodiment acquires a fluorescence signal from the measured sample S. In addition, measurement data of the scattered light or the like detected by the detector 253, such as the CCD, the CMOS, or the photodiode, may be outputted to the information processing apparatus 10 according to the present embodiment.

Note that, although a series of optical systems 27 is provided to detect the scattered light from the measured sample S in the example flow cytometer illustrated in FIG. 3, such optical systems 27 may not be provided. Also note that, while the laser source 21 is used as a light source in the embodiment illustrated in the figures, the laser source 21 may be configured to emit either pulsed light or continuous light.

In the foregoing, the example measuring unit 20 according to the present embodiment has been briefly described with reference to FIGS. 2 and 3.

(1.4. Structure of Information Processing Apparatus)

Next, the information processing apparatus 10 according to the present embodiment will now be described in detail below with reference to FIG. 4. FIG. 4 is a block diagram illustrating the structure of the information processing apparatus 10 according to the present embodiment.

As illustrated in FIG. 4, the information processing apparatus 10 according to the present embodiment primarily includes a data acquisition unit 102, a pulse waveform analysis unit 104, a candidate characteristic determination unit 106, a storage unit 108, an output unit 112, a display control unit 114, and an input unit 116. The information processing apparatus 10 may further include a learning unit 110.

The data acquisition unit 102 is realized by, for example, a central processing unit (CPU), a read-only memory (ROM), a random-access memory (RAM), an input apparatus, a communication apparatus, and so on. The data acquisition unit 102 acquires, from the measuring unit 20, the measurement data of the measured sample S generated by the measuring unit 20.

Here, the measurement data of the measured samples S acquired from the measuring unit 20 is, for example, data representing, by the magnitude of voltage, the intensity of a fluorescence signal generated as a result of a laser beam of a predetermined wavelength having been emitted to one or a certain number of biological subjects. A measurement of the fluorescence signal for the one or the certain number of biological subjects takes a non-zero, though infinitesimal, period of time. Therefore, the measurement data according to the present embodiment includes pulse waveform data having time and voltage (i.e., pulse voltage) as axes as illustrated in FIGS. 5 and 6.

FIGS. 5 and 6 are each an outline diagram of an example pulse waveform detected by the measuring unit illustrated in FIG. 1. The pulse waveform illustrated in FIG. 5 has two peaks, whereas the pulse waveform illustrated in FIG. 6 has three peaks. Here, in related art, an evaluation of a pulse waveform is performed based on the width of a peak(s) of the pulse, a maximum intensity of the peak(s), and the area of the peak(s). Such a related-art evaluation method, however, is not able to distinguish between the pulse waveforms illustrated in FIGS. 5 and 6 when the pulse waveforms illustrated in FIGS. 5 and 6 have the same peak areas, for example. Moreover, while the number of peaks in the pulse waveform may indicate some information, for example, the related-art evaluation method does not allow recognition of this information. In contrast, the information processing apparatus 10 according to an embodiment of the present disclosure makes it possible to estimate, based on shape information of the pulse waveform, characteristics which it is difficult to recognize with the related-art evaluation method. This will be described in detail below.

Once the data acquisition unit 102 acquires the measurement data of the measured sample S of interest, the data acquisition unit 102 supplies the acquired measurement data to the pulse waveform analysis unit 104, which will be described below. In addition, the data acquisition unit 102 may associate time information, such as, for example, a date and time of the acquisition of the measurement data, with the acquired measurement data, and store the time information as history information in the storage unit 108, which will be described below, or the like.

The pulse waveform analysis unit 104 is realized by, for example, a CPU, a field-programmable gate array (FPGA), a digital signal processor (DSP), a ROM, a RAM, and so on. The pulse waveform analysis unit 104 performs a pulse waveform analysis with respect to the supplied measurement data, and identifies the shape information of the pulse waveform.

More specifically, the pulse waveform analysis unit 104 first loads a plurality of shape models stored in the storage unit 108, and selects one of the shape models that best fits the pulse waveform.

FIGS. 7, 8, and 9 are each a schematic diagram illustrating an example shape model that can be used by the pulse waveform analysis unit 104 illustrated in FIG. 4. The shape models can be set as necessary, and are not limited to any particular shape models. Probability distributions, for example, can be used for the shape models. Specific examples include a normal distribution as illustrated in FIG. 7, a lognormal distribution as illustrated in FIG. 8, an exponential distribution, an Erlang distribution, a Weibull distribution, a gamma distribution, a binomial distribution, a t distribution, a chi-square distribution, an F distribution, and a mixture distribution. Examples of mixture distributions include a mixture of normal distributions as illustrated in FIG. 9, and combinations of two or more of the above-mentioned distributions.

Note that the pulse waveform analysis unit 104 may choose, as necessary, the number and type of shape models to be loaded from among the plurality of shape models stored. When only a limited number or type of shape models are loaded, a selection of the shape model that best fits the pulse waveform will be achieved more quickly. Settings as to the number and type of shape models to be loaded are stored, for example, in the storage unit 108. Before loading the shape models, the pulse waveform analysis unit 104 may call up the settings and allow the shape models to be loaded with reference to the settings.

Next, the pulse waveform analysis unit 104 determines which of the loaded shape models best fits the pulse waveform, and selects the shape model that best fits the pulse waveform. This determination and selection can be accomplished by, for example, calculating the goodness of fit of each shape model for the pulse waveform, and extracting the shape model that best fits the pulse waveform (for example, the shape model that has the least goodness of fit, in the case of a method of calculating the goodness of fit as described below).

The method of calculating the goodness of fit is not limited to any particular method. For example, Pearson's chi-square test, a likelihood ratio test, Yates' chi-square test, Mantel-Haenszel chi-square test, a cumulative chi-square test, a linear-by-linear association chi-square test, or the like may be employed to calculate the goodness of fit.

Note that the pulse waveform analysis unit 104 may use another model selection method, such as the Akaike's information criterion (AIC), the Bayesian information criterion (BIC), the minimum description length (MDL), the Akaike Bayesian information criterion (ABIC), the generalized information criterion (GIC), or cross-validation, to select the shape model that fits the pulse waveform.

Next, the pulse waveform analysis unit 104 performs an analysis by comparing the selected shape model with the pulse waveform. A comparison of the selected shape model with the pulse waveform can be accomplished by, for example, performing a curve fitting using a regression analysis, interpolation, extrapolation, or the like, to obtain a regression curve. In addition, at this time, a parameter(s) of the pulse waveform in the selected shape model can be calculated. Examples of such parameters include the mean $\mu$ and the variance $\sigma^2$ in the case where the shape model is a normal distribution, $\mu$ and $\sigma^2$ in the case where the shape model is a lognormal distribution, and the mean $\lambda$ in the case where the shape model is a Poisson distribution. Further, in the case where the shape model is a mixture distribution, a parameter(s) in each of distributions that combine to form the mixture distribution can be calculated.

The pulse waveform analysis unit 104 uses the parameter(s) and the regression curve of the pulse waveform obtained by the above comparison to identify the shape information. Here, in the present embodiment, the shape information identified includes information related to a peak position or positions in the pulse waveform. Examples of the information related to the peak position(s) include the number of peaks, and the position of each peak in the pulse waveform (i.e., the position of each peak in the regression curve). Note that examples of the position of each peak in the pulse waveform include a time (i.e., a position) in a measurement chart including the pulse waveform, and a time (i.e., a position) of the peak in the pulse waveform. Further, in the case where the pulse waveform has a plurality of peaks, that is, in the case where the pulse waveform corresponds to a mixture distribution, the information related to the peak position(s) may include a result of a comparison of the intensities of the plurality of peaks, and/or a result of a comparison of the positions of the plurality of peaks.

Note that the pulse waveform analysis unit 104 may further identify shape information other than the above-described information related to the peak position(s). Examples of such shape information include the parameter(s) of the pulse waveform in the selected shape model as mentioned above, and a peak width, a peak area, a peak intensity, and so on of the pulse waveform (and/or of the regression curve).

Note that the pulse waveform analysis unit 104 may acquire the shape information as described above with respect to a plurality of pulse waveforms of mutually different detection wavelengths. In this case, the shape information may include information as to a result of a comparison of the plurality of pulse waveforms, in addition to the above-described shape information as to each individual pulse waveform. More specifically, the shape information may include information as to a result of a comparison of pieces of information related to the peak position(s), pieces of information related to the position (time) of each pulse waveform, and/or pieces of shape information other than the information related to the peak position(s) of the above pulse waveforms. Examples of such information include a difference (i.e., a time difference) between peak positions of the pulse waveforms, and a result of a comparison of (e.g., a difference or ratio between) peak intensities (i.e., pulse voltages at the peaks) of the pulse waveforms.

The pulse waveforms may be composite information in which fluorescence signals for a plurality of elements of a biological subject intermingle. For example, as illustrated in FIG. 10, a fluorochrome (reagent) 304 used in one cell 300A reacts specifically to a part of the cell such as a part 311 of a nucleus 310, and furthermore, the fluorochrome 304 nonspecifically reacts to the whole of the cell 300A in some cases. In such a case, a simple analysis would submerge the peaks of the part 311 to which the reagent reacts specifically in the peaks caused by the nonspecific reaction of the reagent, and it would not be possible to detect or analyze the peaks of the desired part that shows the specific reaction.

The pulse waveform analysis unit 104 can acquire shape information by performing the following processes as necessary on such a pulse waveform to extract (identify) a peak that is difficult to detect, and performing an analysis on the basis of the waveform including the extracted peak. Additionally, in that case, the pulse waveform analysis unit 104 may also acquire shape information by using not only the waveform including the extracted peak, but also a pulse waveform that has not yet been processed.

Each of FIGS. 11 and 12 is a diagram for describing an example analysis of a pulse waveform by a pulse waveform analysis unit illustrated in FIG. 4.

For example, the pulse waveform analysis unit 104 can identify the peak in a first pulse waveform on the basis of information on a peak in a second pulse waveform detected with a wavelength range different from a wavelength range used to detect the first pulse waveform. The pulse waveform analysis unit 104 then analyzes the peak identified in the first pulse waveform and can acquire shape information of the first pulse waveform including information related to the peak position of the peak. Examples of information related to a peak in the second pulse waveform include the position, height, area, and width of the peak.

More specifically, for example, when a peak of a pulse waveform 400 in a waveform range A (red region) as illustrated in FIG. 11 is difficult to identify, the pulse waveform analysis unit 104 uses a pulse waveform 401 in a wavelength range B (green region) first to identify a peak 410 in the pulse waveform 401. Supposing that the pulse waveform 400 has a peak at the position corresponding to the position (i.e., the time of the peak) of the peak 410, the pulse waveform analysis unit 104 then identifies the peak. This makes it possible to acquire information related to the peak position of a peak in the pulse waveform 400.

In addition, for example, the pulse waveform analysis unit 104 can also acquire a base line obtained by attenuating at least one or more peaks in a pulse waveform, and identify the at least one or more peaks in the pulse waveform on the basis of a result of a comparison of the pulse waveform and the base line.

More specifically, when a pulse waveform 402 is acquired as raw data as illustrated in FIG. 12, the pulse waveform analysis unit 104 processes the pulse waveform 402 with a digital filter first to acquire a base line 403 obtained by attenuating at least one or more peaks in the pulse waveform 402. Examples of the digital filter include a low-pass filter and a high-pass filter that use a moving average. Examples of the moving average include a simple moving average, a weighted moving average, an exponential moving average, a smoothed moving average, a triangular moving average, a sine weighted moving average, a cumulative moving average, and Kolmogorov-Zurbenko filter (KZ filter). The base line 403 acquired through this operation can be, for example, a waveform caused in the pulse wave form 402 by a nonspecific reaction of a reagent. Additionally, processes for acquiring a base line is not limited to a digital filter, but can be one or more selected from a variety of waveform processes.

The pulse waveform analysis unit 104 then subtracts the base line 403 from the pulse waveform 402 to acquire spike data 404 including a region (spike) 405 in which a plus difference. The spike 405 in the spike data 404 having the positions indicated by (1) to (7) can be peaks corresponding to parts to which a reagent in the cell 300A reacts specifically. The pulse waveform analysis unit 104 thus performs gating as necessary, extracts the necessary spike 405, and identifies the extracted spike 405 as a peak. Additionally, an area, height, and width can be calculated for each of the spikes 405 as illustrated in FIG. 12, and used for gating. As described above, it is possible to acquire shape information including information related to the peak position of a peak in the pulse waveform 402.

Additionally, a digital filter may be applied to the pulse waveform 402 before and after the base line 403 is generated in order to remove a noise as necessary. A region in continuous pulse data to be processed as the pulse waveform 402 may be determined in accordance with a signal level of the pulse data or pulse data having another wavelength range.

Then, the pulse waveform analysis unit 104 supplies the shape information obtained as described above to the candidate characteristic determination unit 106.

Based on the identified shape information, the candidate characteristic determination unit 106 determines the estimated candidate characteristic, e.g., the estimated candidate biological characteristic, of the biological subject. More specifically, the candidate characteristic determination unit 106 loads correlation information representing correlations between candidate biological characteristics and pieces of shape information stored in the storage unit 108, and/or a correlation algorithm for making a determination as to the correlations. Further, the candidate characteristic determination unit 106 may additionally or alternatively load correlation information representing correlations between candidate biological characteristics and pieces of shape information generated by the learning unit 110, and/or a correlation algorithm for making a determination as to the correlations. Then, based on the correlation information and/or the correlation algorithm, the candidate characteristic determination unit 106 identifies the candidate biological characteristic estimated from the shape information. Note that, as noted above, the candidate biological characteristics are mere examples of candidate characteristics to be estimated, and that the candidate characteristics are not limited to the candidate biological characteristics. However, in the following description, the candidate biological characteristics are used as the candidate characteristics for the sake of convenience in description.

The above correlation information may be, for example, a data table in which individual pieces of shape information and individual candidate biological characteristics are associated with one another. Use of such a data table enables a quick and easy identification of the candidate biological characteristic.

Further, the candidate biological characteristic to be estimated may be any candidate biological characteristic that can be estimated from the shape information. Examples of such candidate biological characteristics include the degree of localization of a labeled portion(s) (for example, a labeled antigen-binding site(s)), a positional relationship between different labeled portions, and a labeling proportion (e.g., a proportion of antigens present) of each labeled portion (e.g., each antigen-binding site).

Here, an evaluation of a biological subject using a known flow cytometer is performed based on the obtained peak intensity, peak area, and/or peak width. Meanwhile, the shape information used by the candidate characteristic determination unit 106 includes the information related to the peak position(s). Use of this information enables an evaluation as to characteristics, e.g., biological characteristics, which are unanalyzable in related art. An example operation of the candidate characteristic determination unit 106 will now be described below while being compared with a known evaluation method.

FIG. 13 schematically illustrates a biological subject which is supposed to produce a pulse waveform having one peak. FIG. 14 schematically illustrates a biological subject which is supposed to produce a pulse waveform having two peaks. FIG. 15 is a histogram for explaining an identification of a biological subject using peak values of pulse waveforms according to a known technique.

For example, the number of peaks obtained by identifying peak positions can be used as the shape information to grasp the degree of localization of a fluorescent portion(s) of the biological subject. Referring to FIGS. 13 and 14, suppose, for example, that cells 300 that have, on surfaces thereof, the same total amount of antigens 301A and 301B that are capable of emitting fluorescent light in response to the laser beam are to be observed. In this case, pulse waveforms to be obtained may vary in the number of peaks. This is presumed to be because of differences in times at which the antigens 301A and 301B pass the laser beam emitted from the laser source 21. Accordingly, the number of peaks is presumed to correspond to the number of locations at which the antigens are present in the cell 300. Therefore, in the case where the pulse waveform has only one peak as illustrated in FIG. 13, for example, the antigens 301A are presumed to be present locally at only one location in the cell 300. On the other hand, in the case where the pulse waveform has two peaks as illustrated in FIG. 14, the antigens 301B are presumed to be present at two separate locations in the cell 300. Accordingly, the candidate characteristic determination unit 106 is able to estimate the degree of localization of the antigens in the cells 300 as illustrated in FIGS. 13 and 14, making it possible to distinguish between these cells based on the degree of localization. Moreover, such a distinction can be made without the need to create statistical data, and can therefore be made in real time every time the cell 300 passes the laser beam.

Furthermore, in the example of FIG. 14, it is possible to estimate a distance between the locations at which the antigens 301B are present in the cell 300 by determining a difference between the peak positions in the pulse waveform. Furthermore, in the example of FIG. 14, it is possible to estimate the proportion of the antigens present at each location in the cell 300 based on the ratio of the intensities (i.e., pulse voltages) of the two peaks.

Note that, in the case where the cells 300 have an anisotropic shape, the cells 300 traveling in the flow system 23 tend to have a fixed orientation, and this makes the peaks in the pulse waveforms appear more distinctly, making the positions of the peaks more easily determinable. This in turn makes it easier to identify the number of peaks and the peak positions, enabling a more precise analysis.

On the other hand, with the known evaluation method, it is difficult to estimate the candidate biological characteristics as described above. The peak areas, for example, can merely indicate the total amounts of the antigens 301A and 301B. Accordingly, in the case where the total amounts of the antigens 301A and 301B present in the respective cells 300 are the same, it is difficult to distinguish the cells as illustrated in FIGS. 13 and 14 from each other.

Further, because the maximum peak value (i.e., pulse potential) decreases as the antigens 301A and 301B present in the cells 300 become more dispersed as illustrated in FIGS. 13 and 14, it is conceivable to distinguish between the cells 300 having different degrees of localization of the antigens 301A and 301B based on the maximum peak intensity.

In this case, as illustrated in FIG. 15, a histogram of the numbers of occurrences of pulse waveforms (i.e., the number of events) counted in accordance with the maximum peak value of the pulse waveforms is created. However, maximum peak values commonly obtained have variations due to, for example, variations in the amount of antigens attached to the cells. Therefore, as illustrated in FIG. 15, a plurality of peaks of a commonly obtained histogram often overlap, making precise identification difficult to achieve. Furthermore, real-time identification is difficult with a known method because the histogram has to be created before the identification.

Further, another example operation of the candidate characteristic determination unit 106 will now be described below. FIGS. 16 and 17 are outline diagrams for explaining identification and discrimination of the positional relationship between different antigens in a cell. A case where a plurality of antigens 302 and 303 stained with different fluorescent substances are present in cells 300 as illustrated in FIGS. 16 and 17 will be examined. In this case, a difference (e.g., time differences t1 and t2) may occur between a peak position in a pulse waveform of wavelength range A originating from the antigen 302 and a peak position in a pulse waveform of wavelength range B originating from the antigen 303. Such a time difference between the peak positions is presumed to be due to a difference between times at which the antigens 302 and 303 pass the laser beam emitted from the laser source 21, and to indicate relative positions of the antigens 302 and 303 in the cell 300. Therefore, the candidate characteristic determination unit 106 is able to determine, as the candidate biological characteristics, the relative positions of the antigens 302 and 303 in the cells 300 based on t1 and t2. Furthermore, a difference between t1 and t2 can be used to distinguish between the cells 300 in accordance with the locations of the antigens 302 and 303.

Meanwhile, a known method is unable to distinguish between the cells 300 in accordance with the locations of the antigens 302 and 303 as illustrated in FIGS. 16 and 17, because the peak area, the maximum peak value (i.e., pulse voltage), and the peak width do not differ between the wavelength ranges A and B in both examples of FIGS. 16 and 17.

For example, when a pulse waveform illustrated in FIG. 11 is acquire, the candidate characteristic determination unit 106 can calculate a proportion (labeling proportion) of localized and bound fluorochromes and the degree of localization on the basis of a result of a comparison of the shape of a peak of the pulse waveform 400 identified using the pulse waveform 401 in the wavelength range B, and the shape of the pulse waveform 400. Even if the peak area, maximum peak value, and peak width of the whole pulse waveform in the wavelength range A are simply calculated, it is still difficult to calculate a proportion (labeling proportion) of fluorochromes localized and bound in this way, and the degree of localization.

When the pulse waveform 402 illustrated in FIG. 12 is acquired, the pulse waveform analysis unit 104 can acquire the spikes 405 serving as peaks. Accordingly, it is possible to estimate candidate biological characteristics by using shape information acquired from these spikes 405. Additionally, it is not possible to acquire, by the method for simply calculating the peak area, maximum peak value (pulse voltage), and peak width of the pulse waveform 402, detailed candidate biological characteristics acquired in the present embodiment.

Information as to the candidate biological characteristic estimated by the candidate characteristic determination unit 106 in the above-described manner is inputted to the output unit 112 together with the shape information and the measurement data. In addition, the information as to the estimated candidate biological characteristic, the shape information, and the measurement data are inputted to the learning unit 110 and/or the storage unit 108 as necessary.

The storage unit 108 is realized by, for example, a RAM, a storage apparatus, or the like provided in the information processing apparatus 10 according to the present embodiment. The storage unit 108 stores the shape models and an analysis program used by the pulse waveform analysis unit 104 to identify the shape information, the correlation information representing the correlations between the candidate biological characteristics and the pieces of shape information and/or the correlation algorithm for making a determination as to the correlations used by the candidate characteristic determination unit 106, and learning data generated by the learning unit 110. In addition, various measurement data acquired by the data acquisition unit 102 and so on may be stored in the storage unit 108. Furthermore, executable data for various applications used by the pulse waveform analysis unit 104, the candidate characteristic determination unit 106, and the display control unit 114 to display various information on a display screen may be stored in the storage unit 108. Furthermore, the storage unit 108 stores, as necessary, various parameters which have to be stored when the information processing apparatus 10 performs processes, data concerning the processes in progress, and so on, or various databases or the like. The storage unit 108 is configured such that each processing unit of the information processing apparatus 10 according to the present embodiment is able to freely read and write information from or to the storage unit 108.

The learning unit 110 subjects a correlation between the candidate biological characteristic and the shape information determined by the candidate characteristic determination unit 106 to statistical processing, and generates new correlation information representing the correlation between the candidate biological characteristic and the shape information, and/or a correlation algorithm for making a determination as to the correlation. The generated correlation information and/or the generated correlation algorithm are inputted to the storage unit 108. Note that the generated correlation information and/or the generated correlation algorithm may alternatively be inputted to the candidate characteristic determination unit 106 without being passed through the storage unit 108. Also note that the learning unit 110 may acquire information for generating the above correlation information and/or the above correlation algorithm from the input unit 116.

The learning unit 110 may adopt any learning method, and may adopt, for example, one or an appropriate combination of machine learning, reinforcement learning, deep learning, a neural network, a support vector machine (SVM), a genetic algorithm (GA), Bayesian estimation, and so on.

The output unit 112 is realized by, for example, a CPU, a ROM, a RAM, a storage apparatus, a drive, a connection port, a communication apparatus, and so on. The output unit 112 outputs the correlation information as to the correlation between the candidate biological characteristic and the shape information acquired by the candidate characteristic determination unit 106, the measurement data, and so on to the display control unit 114, another device, or another medium. For example, the output unit 112 may present, to a user, the acquired correlation information and so on in a printed form through an output apparatus, such as a printer or the like, or may output data representing the acquired correlation information to any of a USB memory and various other recording media, including a CD, a DVD, and a Blu-ray disk. Also, the output unit 112 may output the data representing the acquired correlation information to an external device with which the information processing apparatus 10 according to the present embodiment is capable of communicating through any of various communication networks.

The display control unit 114 is realized by, for example, a CPU, a ROM, a RAM, a communication apparatus, an output apparatus, and so on. The display control unit 114 controls display of a display screen on a display apparatus such as, for example, a display of the information processing apparatus 10, or on a display apparatus such as, for example, a display provided outside of the information processing apparatus 10. In more detail, the display control unit 114 controls the display of the display screen based on the information as to the correlation between the candidate characteristic and the shape information inputted from the output unit 112. The control by the display control unit 114 of the display of the display screen concerning the correlation between the candidate biological characteristic and the shape information enables the user of the information processing apparatus 10 to grasp a result of the determination of the candidate biological characteristic.

The input unit 116 is realized by, for example, a CPU, a ROM, a RAM, an input apparatus, a drive, a connection port, a communication apparatus, and so on. The input unit 116 is configured to be capable of inputting information or various instructions inputted by the user, an external medium, or the like, for example, into various portions of the information processing apparatus 10. In particular, the input unit 116 inputs, into the storage unit 108, the shape models and an analysis algorithm used by the pulse waveform analysis unit 104, and the correlation information representing the correlations between the candidate biological characteristics and the shape information and/or the correlation algorithm for making a determination as to the correlations used by the candidate characteristic determination unit 106. In addition, in particular, the input unit 116 inputs, into the learning unit 110, the information used by the learning unit 110 to generate the correlation information and/or the correlation algorithm.

Example functions of the information processing apparatus 10 according to the present embodiment have been described above. Each of the structural elements described above may be formed using a general-purpose member or circuit, or may be formed by a piece of hardware specialized for the function of the structural element. Note that the functions of all the structural elements may be implemented by the CPU or the like. Thus, the structural elements used may be changed as appropriate in accordance with the current technological level at the time when the present embodiment is carried out.

Note that a computer program for implementing each function of the information processing apparatus according to the present embodiment as described above may be produced and installed on a personal computer or the like. Also note that a computer-readable recording medium having such a computer program stored therein can be provided. Examples of such a recording medium include a magnetic disk, an optical disk, a magneto-optical disk, and a flash memory. Also note that the computer program as described above may be delivered via, for example, a network without use of a recording medium.

(1.5. Procedure of Information Processing Method)

Next, an example procedure of an information processing method according to the present embodiment will now be briefly described below with reference to FIG. 18. FIG. 18 is a flowchart illustrating an example procedure of the information processing method according to the first embodiment.

The data acquisition unit 102 of the information processing apparatus 10 according to the present embodiment acquires data (i.e., the measurement data) of the fluorescence signal measured by the measuring unit 20 (step S101), and outputs the acquired measurement data to the pulse waveform analysis unit 104.

The pulse waveform analysis unit 104 loads some of the shape models from the storage unit 108, and then calculates the goodness of fit of each shape model with respect to each pulse waveform in the inputted measurement data (S103). Additionally, the pulse waveform analysis unit 104 can also perform a comparison with another pulse waveform and process each pulse waveform in measurement data as necessary with a digital filter and the like.

Next, the pulse waveform analysis unit 104 identifies the shape model to be used in the processing of each pulse waveform, based on the calculated goodness of fit of each shape model (S105). More specifically, the pulse waveform analysis unit 104 compares the calculated goodness of fit of the shape model with goodness of fit of another shape model, and extracts the shape model that has the least goodness of fit (that is, that fits best) to identify the shape model to be used in the processing of each pulse waveform.

Next, the pulse waveform analysis unit 104 identifies the shape information of each pulse waveform using the identified shape model (S107). More specifically, the pulse waveform analysis unit 104 performs a curve fitting on each pulse waveform using the shape model to obtain a regression curve, and obtains a parameter(s) concerning each pulse waveform in the regression curve. Next, the pulse waveform analysis unit 104 identifies the shape information including the information related to the peak position(s). The pulse waveform analysis unit 104 outputs the acquired shape information to the candidate characteristic determination unit 106.

Next, the candidate characteristic determination unit 106 determines the estimated candidate biological characteristic of the biological subject, based on the identified shape information (S109). More specifically, the candidate characteristic determination unit 106 loads the correlation information representing the correlations between the candidate biological characteristics and the pieces of shape information, and/or the correlation algorithm(s) for making a determination as to the correlations, stored in the storage unit 108 and/or generated in the learning unit 110. Next, based on the correlation information and/or the correlation algorithm(s), the candidate characteristic determination unit 106 identifies the candidate biological characteristic estimated from the shape information. Finally, the candidate characteristic determination unit 106 outputs the identified candidate biological characteristic to the output unit 112 together with other necessary information.

Next, the output unit 112 causes information as to the estimated candidate biological characteristic with respect to each pulse waveform to be displayed via the display control unit 114. The user is thus able to recognize the candidate biological characteristic of the biological subject used. An example procedure of information processing according to the present embodiment has been briefly described above with reference to FIG. 18.

As described above, according to the present embodiment, the shape information of the pulse waveform obtained from the biological subject, in particular, the information related to the peak position(s) in the pulse waveform, is used to estimate the candidate characteristic, e.g., the candidate biological characteristic, of the biological subject, which it is difficult to estimate with known methods. The candidate characteristic of the biological subject thus estimated can be suitably used to identify the biological subject. Accordingly, it is made possible to identify the biological subject using an indicator that is not used with known methods. In addition, the information processing system 1 according to the present embodiment does not require use of a specialized measuring unit, and is able to easily accomplish the identification of the biological subject as described above using a measuring unit having a known structure.

Furthermore, candidate characteristics that have not previously been used in flow cytometry as described above can be used singly or in combination with other candidate characteristics, or in combination with a commonly used indicator, to identify the biological subject.

The information processing system 1 and the information processing method according to the present embodiment as described above enable analysis concerning the number of locations at which antigens are locally present, and concerning a correlation between the above antigens and other antigens, for example, in the examples of FIGS. 13 and 14 and of FIGS. 16 and 17 described above. In addition, the information processing system 1 and the information processing method according to the present embodiment enable, for example, a comparative analysis which determines whether or not a process (e.g., heat treatment or a staining process) which is previously performed on the measured samples, a difference in time that has elapsed after such a process, or the like will cause a change or difference in the number of locations at which antigens are locally present, or the positional relationship between the locations at which the antigens are locally present. Furthermore, a combination of such analyses will be enabled thereby. Such analyses can be performed by the information processing apparatus 10, another information processing apparatus provided outside of the information processing system 1, or the user.

2. Second Embodiment (Cell Sorter)

A second embodiment of the present disclosure will be described in detail below with reference to FIGS. 19 to 21.

(2.1. Structure of Information Processing System)

First, an information processing system according to the present embodiment will now be described below with reference to FIG. 19. FIG. 19 is a block diagram illustrating the information processing system according to the second embodiment. Referring to FIG. 19, an information processing system 1A according to the present embodiment is different from the information processing system 1 according to the first embodiment primarily in that a measuring unit 20A includes a sorting unit 29, that is, in that the measuring unit 20A is a cell sorter capable of sorting. Hereinafter, differences from the first embodiment of the present embodiment will be primarily described, and redundant description is omitted.

Referring to FIG. 19, the measuring unit 20A is a so-called cell sorter, and includes a measuring section 28 and the sorting unit 29.

The measuring section 28 corresponds to the measuring unit 20 in the first embodiment. In addition, the measuring section 28 performs a measurement concerning measured samples S, and conveys the measured samples S to the sorting unit 29 after the measurement.

The sorting unit 29 sorts biological subjects in accordance with an instruction from an information processing apparatus 10A. More specifically, the sorting unit 29 generates droplets of measured samples S containing the biological subjects. At this time, the droplets of the measured samples S that are to be sorted out are charged. Next, the sorting unit 29 allows the obtained droplets to travel in an electric field generated by a deflection plate. At this time, the charged droplets are attracted to the deflection plate charged, to cause a change in the direction in which the droplets travel. As a result, the droplets to be sorted out and the droplets not to be sorted out are separated from each other. This allows the sorting unit 29 to sort the biological subjects to acquire sorted samples Sp. Note that the sorting unit 29 may employ either a jet-in-air system or a cuvette flow cell system as a sorting system.

Next, a candidate characteristic determination unit 106A of the information processing apparatus 10A determines a candidate biological characteristic of the biological subject, and instructs the sorting unit 29, through an output unit 112A, to sort out a target measured sample S.

Note that such an instruction to the sorting unit 29 may be issued based on the determined candidate biological characteristic of the biological subject, or based on a result of an analysis of the shape information.

(2.2. Procedures of Information Processing Methods)

Next, example procedures of information processing methods according to the present embodiment will now be briefly described below with reference to FIGS. 20 and 21.

FIGS. 20 and 21 are each a flowchart illustrating an example procedure of an information processing method according to the second embodiment. Note that, since the information processing system 1A according to the present embodiment includes the sorting unit 29, each of the information processing methods according to the present embodiment forms a part of a sorting method.

First, the procedure of the information processing method illustrated in FIG. 20 will now be described below. Note that S201 to S207 are similar to S101 to S107 in the first embodiment described above, and descriptions of S201 to S207 are omitted.

Upon an input of the shape information identified by the pulse waveform analysis unit 104, the candidate characteristic determination unit 106A determines, based on the shape information of the pulse waveform, whether the biological subject that has produced the pulse waveform in question is to be sorted out to perform sorting (S209).

Next, the candidate characteristic determination unit 106A identifies an estimated candidate biological characteristic for the sorted biological subject based on the shape information (S211).

The information processing apparatus 10A determines whether each biological subject is to be sorted out based on the shape information as described above, and is thus able to accomplish quick sorting out of target biological subjects. Moreover, the information processing apparatus 10A estimates the candidate biological characteristics of only biological subjects sorted out, and thus achieves a reduction in computational load.

Next, the procedure of the information processing method illustrated in FIG. 21 will now be described below. Note that S201 to S213 in FIG. 21 are similar to S101 to S109 in the first embodiment described above, and descriptions of S201 to S213 are omitted.

The candidate characteristic determination unit 106A determines whether the biological subject whose candidate biological characteristic has been identified is to be sorted out (S215). If the biological subject is to be sorted out (i.e., if YES), the candidate characteristic determination unit 106A instructs the sorting unit 29, through the output unit 112A, to sort out the biological subject. The sorting unit 29 sorts out the biological subject in response to the instruction (S217).

Meanwhile, if the biological subject is not to be sorted out (i.e., if NO), the candidate characteristic determination unit 106A terminates the procedure (END) without issuing the instruction to the sorting unit 29.

Note that indications of how the sorting is being carried out and of the identified candidate biological characteristic are provided as necessary by the display control unit 114.

The procedures of the information processing methods according to the second embodiment of the present disclosure have been described above with reference to FIGS. 20 and 21.

The present embodiment described above is able to achieve beneficial effects similar to those of the above-described first embodiment. In addition, the present embodiment described above allows sorting of the identified biological subjects using an indicator which is not used with known methods, i.e., the shape information of the pulse waveform, as necessary. This enables sorting based on the candidate characteristics of the biological subjects, e.g., the biological characteristics, which it is difficult to achieve with known methods.

3. Hardware Configuration of Information Processing Apparatus

Next, the hardware configuration of the information processing apparatus 10 according to the first embodiment of the present disclosure will be described in detail with reference to FIG. 22. FIG. 22 is a block diagram for illustrating the hardware configuration of the information processing apparatus 10 according to the first embodiment of the present disclosure. Note that the structure of the information processing apparatus 10A according to the second embodiment of the present disclosure can be similar to the structure of the information processing apparatus 10, and therefore, the information processing apparatus 10 will be described below as a representative.

The information processing apparatus 10 mainly includes a CPU 901, a ROM 902, and a RAM 903. Furthermore, the information processing apparatus 10 also includes a host bus 907, a bridge 909, an external bus 911, an interface 913, an input apparatus 915, an output apparatus 917, a storage apparatus 919, a drive 921, a connection port 923, and a communication apparatus 925.

The CPU 901 serves as an arithmetic processing apparatus and a control apparatus, and controls the overall operation or a part of the operation of the information processing apparatus 10 according to various programs recorded in the ROM 902, the RAM 903, the storage apparatus 919, or a removable recording medium 927. The ROM 902 stores programs, operation parameters, and the like used by the CPU 901. The RAM 903 primarily stores programs that the CPU 901 uses and parameters and the like varying as appropriate during the execution of the programs. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The input apparatus 915 is an operation mechanism operated by a user, such as a mouse, a keyboard, a touch panel, buttons, a switch and a lever. Also, the input apparatus 915 may be a remote control mechanism (a so-called remote control) using, for example, infrared light or other radio waves, or may be an externally connected apparatus 929 such as a mobile phone or a PDA conforming to the operation of the information processing apparatus 10. Furthermore, the input apparatus 915 generates an input signal based on, for example, information which is input by a user with the above operation mechanism, and is configured from an input control circuit for outputting the input signal to the CPU 901. The user of the information processing apparatus 10 can input various data to the information processing apparatus 10 and can instruct the information processing apparatus 10 to perform processing by operating this input apparatus 915.

The output apparatus 917 is configured from a device capable of visually or audibly notifying acquired information to a user. Examples of such device include display apparatuses such as a CRT display apparatus, a liquid crystal display apparatus, a plasma display apparatus, an EL display apparatus and lamps, audio output apparatuses such as a speaker and a headphone, a printer, a mobile phone, a facsimile machine, and the like. For example, the output apparatus 917 outputs a result obtained by various processings performed by the information processing apparatus 10. More specifically, the display apparatus displays, in the form of texts or images, a result obtained by various processes performed by the information processing apparatus 10. On the other hand, the audio output apparatus converts an audio signal such as reproduced audio data and sound data into an analog signal, and outputs the analog signal.

The storage apparatus 919 is a device for storing data configured as an example of a storage unit of the information processing apparatus 10 and is used to store data. The storage apparatus 919 is configured from, for example, a magnetic storage apparatus such as a HDD (Hard Disk Drive), a semiconductor storage apparatus, an optical storage apparatus, or a magneto-optical storage apparatus. This storage apparatus 919 stores programs to be executed by the CPU 901, various data, and various data obtained from the outside.

The drive 921 is a reader/writer for recording medium, and is embedded in the information processing apparatus 10 or attached externally thereto. The drive 921 reads information recorded in the attached removable recording medium 927 such as a magnetic disk, an optical disk, a magneto-optical disk, or a semiconductor memory, and outputs the read information to the RAM 903. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing apparatuses to directly connect to the information processing apparatus 10. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the information processing apparatus 10 directly obtains various data from the externally connected apparatus 929 and provides various data to the externally connected apparatus 929.

The communication apparatus 925 is a communication interface configured from, for example, a communication apparatus for connecting to a communication network 931. The communication apparatus 925 is, for example, a wired or wireless LAN (Local Area Network), Bluetooth (registered trademark), a communication card for WUSB (Wireless USB), or the like. Alternatively, the communication apparatus 925 may be a router for optical communication, a router for ADSL (Asymmetric Digital Subscriber Line), a modem for various communications, or the like. This communication apparatus 925 can transmit and receive signals and the like in accordance with a predetermined protocol such as TCP/IP on the Internet and with other communication apparatuses, for example. The communication network 931 connected to the communication apparatus 925 is configured from a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing apparatus 10 according to the first embodiment of the present disclosure has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

For example, some of the functions of the information processing apparatus 10, for example, the function(s) of the pulse waveform analysis unit 104, the candidate characteristic determination unit 106, and/or the learning unit 110, may be implemented using a controller chip. The measuring unit 20, such as the flow cytometer or the like, generally has to handle a great number of biological subjects quickly in a limited period of time. When the processes of some of the above-described components of the information processing apparatus 10 are performed in an integrated manner on the controller chip, the processes of the components can be accomplished more quickly. Moreover, use of such a controller chip may lead to a reduced load on another piece of hardware of the information processing apparatus 10.

Note that any controller chip may be used as such a controller chip. Examples of such controller chips include programmable logic devices (PLDs), such as, for example, a field-programmable gate array (FPGA), a complex programmable logic device (CPLD), a programmable array logic (PAL), and a generic array logic (GAL), and an application-specific integrated circuit (ASIC). The FPGA is particularly suitable as the controller chip, because the FPGA is easily reconfigurable and is capable of relatively fast computation.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to an embodiment of the present disclosure can exhibit other effects that are evident to those skilled in the art along with or instead of the effects based on the present specification.

Additionally, the present technology may also be configured as below:

(1) A system comprising:
a flow cytometer configured to generate data indicative of a pulse waveform corresponding to a fluorescence signal of a biological sample;
circuitry configured to:
determine peak position information of the pulse waveform by identifying at least one peak of the pulse waveform; and
determine at least one biological characteristic of the biological sample based on the peak position information.

(2) The system of claim (1), wherein determining the at least one biological characteristic includes comparing the peak position information to data relating pulse waveform information to different biological characteristics.

(3) The system of claim (1), wherein determining at least one biological characteristic includes identifying a location of at least one biological component within the biological sample.

(4) The system of claim (3), wherein the at least one biological component includes an antigen.

(5) The system of claim (1), wherein determining peak position information includes identifying a number of peaks, and determining at least one biological characteristic includes determining a number of locations of the at least one biological component within the biological sample based on the number of peaks.

(6) The system of claim (1), wherein determining peak position information includes:
determining a first time associated with a first peak of the pulse waveform and a second time associated with a second peak of the pulse waveform; and
determining a time difference between the first time associated with the first peak and the second time associated with the second peak.

(7) The system of claim (6), wherein determining at least one biological characteristic includes determining a distance between a first location of at least one biological component and a second location of the at least one biological component within the biological sample based on the time difference between the first time and the second time.

(8) The system of claim (1), wherein determining peak position information includes determining a peak area for the at least one peak of the pulse waveform.

(9) The system of claim (8), wherein determining at least one biological characteristic includes determining an amount of at least one biological component based on the peak area.

(10) The system of claim (1), wherein determining peak position information includes determining a maximum peak value for the at least one peak of the pulse waveform.

(11) The system of claim (10), wherein determining at least one biological characteristic includes determining an indication of a degree of localization of at least one biological component based on the maximum peak value.

(12) The system of claim (1), wherein the circuitry is further configured to generate an instruction to sort the biological sample based on the peak position information and transmit the instruction to the flow cytometer, wherein the flow cytometer sorts the biological sample in response to receiving the instruction.

(13) The system of claim (1), wherein the circuitry is further configured to generate an instruction to sort the biological sample based on the at least one biological characteristic and transmit the instruction to flow cytometer, wherein the flow cytometer sorts the biological sample in response to receiving the instruction.

(14) The system of claim (1), wherein determining peak position information includes determining peak position information of the pulse waveform by comparing the pulse waveform to at least one shape model.

(15) The system of claim (14), wherein determining the peak position information of the pulse waveform includes selecting a shape model from among the at least one shape model by calculating a level by which the shape model fits the pulse waveform and calculating a regression curve of the pulse waveform and/or at least one parameter of the pulse waveform based on comparing the pulse waveform to the selected shape model.

(16) The system of claim (1), wherein the pulse waveform includes a plurality of peaks and the peak position information includes information for each of the plurality of peaks.

(17) The system of claim (16), wherein determining peak position information includes comparing a first intensity corresponding to a first peak of the plurality of peaks and a second intensity corresponding to a second peak of the plurality of peaks.

(18) The system of claim (17), wherein determining peak position information includes determining a time difference between a first peak of the plurality of peaks and a second peak of the plurality of peaks.

(19) The system of claim (1), wherein the data includes a first pulse waveform and a second pulse waveform, the first pulse waveform corresponds to data generated with a first wavelength range and the second pulse waveform corresponds to data generated with a second wavelength range, and wherein determining peak position information includes determining peak position information by comparing the first pulse waveform and the second pulse waveform.

(20) The system of claim (19), wherein determining peak position information includes identifying a peak in the second pulse waveform and identifying a peak in the first pulse waveform based on peak information for the peak in the second pulse waveform.

(21) The system of claim (19), wherein the first pulse waveform is indicative of data corresponding to a first fluorophore that specifically labels a part of the biological sample and the second waveform is indicative of data corresponding to a second fluorophore that nonspecifically labels the biological sample.

(23) The system of claim (1), wherein the circuitry is further configured to determine a base line for the pulse waveform and determining peak position information includes subtracting the base line from the pulse waveform.

(24) The system of claim (23), wherein acquiring a baseline for the pulse waveform includes applying a digital filter to the pulse waveform.

(25) The system of claim (1), wherein the biological sample is a cell, microorganism or a biological polymer.

(26) A flow cytometer information processing method comprising:
determining peak position information of a pulse waveform corresponding to a fluorescence signal of a biological sample by identifying at least one peak of the pulse waveform; and
determining at least one biological characteristic of the biological sample based on the peak position information.

(27) At least one computer-readable storage medium storing computer-executable instructions that, when executed, perform a flow cytometer information processing method comprising:
determining peak position information of a pulse waveform corresponding to a fluorescence signal of a biological sample by identifying at least one peak of the pulse waveform; and
determining at least one biological characteristic of the biological sample based on the peak position information.

(28) An information processing apparatus including:
a pulse waveform analysis unit configured to identify, based on data of a pulse waveform detected as a result of emitting a beam of light to a moving biological subject, information related to a peak position or positions in the pulse waveform; and
a candidate characteristic determination unit configured to determine an estimated candidate characteristic of the biological subject based on the information related to the peak position or positions.

(29) The information processing apparatus according to (28),
wherein the information related to the peak position or positions includes a number of peaks in the pulse waveform.

(30) The information processing apparatus according to (28) or (29),
wherein, when the pulse waveform has a plurality of peaks, the information related to the peak position or positions includes a result of a comparison of intensities of the plurality of peaks.

(31) The information processing apparatus according to any one of (28) to (30),
wherein, when the pulse waveform has a plurality of peaks, the information related to the peak position or positions includes a result of a comparison of positions of the plurality of peaks.

(32) The information processing apparatus according to any one of (28) to (31),
wherein the pulse waveform analysis unit analyzes a plurality of the pulse waveforms, the plurality of the pulse waveforms being of mutually different wavelength ranges, and identifies the information related to the peak position or positions with respect to each of the plurality of the pulse waveforms.

(33) The information processing apparatus according to (32),
wherein the information related to the peak position or positions includes a result of a comparison of peak positions in the plurality of pulse waveforms of the mutually different wavelength ranges.

(34) The information processing apparatus according to any one of (28) to (33),
wherein the pulse waveform analysis unit selects, from a plurality of predetermined shape models, a shape model related to the pulse waveform, and compares the pulse waveform with the selected shape model to perform an analysis.

(35) The information processing apparatus according to any one of (28) to (34),
wherein the pulse waveform analysis unit identifies a peak in a first pulse waveform, based on a peak in a second pulse waveform detected with a wavelength range different from a wavelength range used to detect the first pulse waveform.

(36) The information processing apparatus according to any one of (28) to (34),
wherein the pulse waveform analysis unit acquires a base line obtained by attenuating at least one or more peaks in the pulse waveform, and identify the at least one or more peaks in the pulse waveform, based on a result of a comparison of the pulse waveform and the base line.

(37) The information processing apparatus according to any one of (28) to (36), further including:
a storage unit configured to store correlation information representing a correlation between the candidate characteristic and the information related to the peak position or positions.

(38) The information processing apparatus according to any one of (28) to (37), further including:
a learning unit configured to learn a correlation between the candidate characteristic and the information related to the peak position or positions.

(39) The information processing apparatus according to any one of (28) to (38),
wherein the biological subject has an anisotropic shape.

(40) The information processing apparatus according to any one of (28) to (39),
wherein the estimated candidate characteristic is used as information for sorting of the biological subject.

(41) An information processing method including:
identifying, based on data of a pulse waveform detected as a result of emitting a beam of light to a moving biological subject, information related to a peak position or positions in the pulse waveform; and
determining an estimated candidate characteristic of the biological subject based on the information related to the peak position or positions.

(42) An information processing system including:
a flow cytometer configured to emit a beam of light to a moving biological subject, and detect a pulse waveform; and
an information processing apparatus including a pulse waveform analysis unit configured to identify, based on data of the pulse waveform, information related to a peak position or positions in the pulse waveform, and a candidate characteristic determination unit configured to determine an estimated candidate characteristic of the biological subject based on the information related to the peak position or positions.

(43) The information processing system according to (42),
wherein the flow cytometer includes a sorting unit capable of sorting the biological subject, and
wherein the sorting unit is configured to sort the biological subject in accordance with the information related to the peak position or positions.

REFERENCE SIGNS LIST 1, 1A information processing system
10, 10A information processing apparatus
20, 20A measuring unit
21 laser source
23 flow system
231 flow cell
25 photodetector
251 photomultiplier
253 detector
27 optical system
271 wavelength selection filter
28 measuring section
29 sorting unit
102 data acquisition unit
104 pulse waveform analysis unit
106, 106A candidate characteristic determination unit
108 storage unit
110 learning unit
112, 112A output unit
114 display control unit
116 input unit
300, 300A cell
301A, 301B, 302, 303 antigen
304 fluorochrome
310 nucleus
400, 401, 402 pulse waveform
403 base line
404 spike data
405 spike
410 peak
901 CPU
902 ROM
903 RAM
907 host bus
909 bridge
911 external bus
913 interface
915 input apparatus
917 output apparatus
919 storage apparatus
921 drive
923 connection port
925 communication apparatus
927 removable recording medium
929 externally connected apparatus
931 communication network

The invention claimed is:

1. A system comprising:
a flow cytometer configured to generate data indicative of a pulse waveform corresponding to a fluorescence signal of a biological sample;
circuitry configured to:
determine peak position information of the pulse waveform by identifying at least one peak of the pulse waveform; and
determine at least one biological characteristic of the biological sample based on the peak position information.

2. The system of claim 1, wherein determining the at least one biological characteristic includes comparing the peak position information to data relating pulse waveform information to different biological characteristics.

3. The system of claim 1, wherein determining at least one biological characteristic includes identifying a location of at least one biological component within the biological sample.

4. The system of claim 3, wherein the at least one biological component includes an antigen.

5. The system of claim 1, wherein determining peak position information includes identifying a number of peaks, and determining at least one biological characteristic includes determining a number of locations of the at least one biological component within the biological sample based on the number of peaks.

6. The system of claim 1, wherein determining peak position information includes:
determining a first time associated with a first peak of the pulse waveform and a second time associated with a second peak of the pulse waveform; and
determining a time difference between the first time associated with the first peak and the second time associated with the second peak.

7. The system of claim 6, wherein determining at least one biological characteristic includes determining a distance between a first location of at least one biological component and a second location of the at least one biological component within the biological sample based on the time difference between the first time and the second time.

8. The system of claim 1, wherein determining peak position information includes determining a peak area for the at least one peak of the pulse waveform.

9. The system of claim 8, wherein determining at least one biological characteristic includes determining an amount of at least one biological component based on the peak area.

10. The system of claim 1, wherein determining peak position information includes determining a maximum peak value for the at least one peak of the pulse waveform.

11. The system of claim 10, wherein determining at least one biological characteristic includes determining an indication of a degree of localization of at least one biological component based on the maximum peak value.

12. The system of claim 1, wherein the circuitry is further configured to generate an instruction to sort the biological sample based on the peak position information and transmit the instruction to the flow cytometer, wherein the flow cytometer sorts the biological sample in response to receiving the instruction.

13. The system of claim 1, wherein the circuitry is further configured to generate an instruction to sort the biological sample based on the at least one biological characteristic and transmit the instruction to the flow cytometer, wherein the flow cytometer sorts the biological sample in response to receiving the instruction.

14. The system of claim 1, wherein determining peak position information includes determining peak position information of the pulse waveform by comparing the pulse waveform to at least one shape model.

15. The system of claim 14, wherein determining the peak position information of the pulse waveform includes selecting a shape model from among the at least one shape model by calculating a level by which the shape model fits the pulse waveform and calculating a regression curve of the pulse waveform and/or at least one parameter of the pulse waveform based on comparing the pulse waveform to the selected shape model.

16. The system of claim 1, wherein the pulse waveform includes a plurality of peaks and the peak position information includes information for each of the plurality of peaks.

17. The system of claim 16, wherein determining peak position information includes comparing a first intensity corresponding to a first peak of the plurality of peaks and a second intensity corresponding to a second peak of the plurality of peaks.

18. The system of claim 17, wherein determining peak position information includes determining a time difference between a first peak of the plurality of peaks and a second peak of the plurality of peaks.

19. The system of claim 1, wherein the data includes a first pulse waveform and a second pulse waveform, the first pulse waveform corresponds to data generated with a first wavelength range and the second pulse waveform corresponds to data generated with a second wavelength range, and wherein determining peak position information includes determining peak position information by comparing the first pulse waveform and the second pulse waveform.

20. The system of claim 19, wherein determining peak position information includes identifying a peak in the second pulse waveform and identifying a peak in the first pulse waveform based on peak information for the peak in the second pulse waveform.

21. The system of claim 19, wherein the first pulse waveform is indicative of data corresponding to a first fluorophore that specifically labels a part of the biological sample and the second waveform is indicative of data corresponding to a second fluorophore that nonspecifically labels the biological sample.

22. The system of claim 1, wherein the circuitry is further configured to determine a base line for the pulse waveform and determining peak position information includes subtracting the base line from the pulse waveform.

23. The system of claim 22, wherein acquiring a baseline for the pulse waveform includes applying a digital filter to the pulse waveform.

24. The system of claim 1, wherein the biological sample is a cell, microorganism or a biological polymer.

25. A flow cytometer information processing method comprising:
    determining peak position information of a pulse waveform corresponding to a fluorescence signal of a biological sample by identifying at least one peak of the pulse waveform; and
    determining at least one biological characteristic of the biological sample based on the peak position information.

26. At least one non-transitory computer-readable storage medium storing computer-executable instructions that, when executed, perform a flow cytometer information processing method comprising:
    determining peak position information of a pulse waveform corresponding to a fluorescence signal of a biological sample by identifying at least one peak of the pulse waveform; and
    determining at least one biological characteristic of the biological sample based on the peak position information.

* * * * *